United States Patent
Uenohara et al.

(10) Patent No.: US 10,969,595 B2
(45) Date of Patent: Apr. 6, 2021

(54) IN-VEHICLE CONTENT DISPLAY APPARATUS

(71) Applicant: International Business Machines Corporation, Armonk, NY (US)

(72) Inventors: Hayato Uenohara, Funabashi (JP); Takeyuki Shimura, Setagaya-ku (JP); Yuhichi Takahashi, Zama (JP); Takuya Matsunaga, Ichikawa (JP); Hiroki Yoshinaga, Urayasu (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/205,320

(22) Filed: Nov. 30, 2018

(65) Prior Publication Data

US 2020/0174261 A1     Jun. 4, 2020

(51) Int. Cl.
*G02B 27/01*     (2006.01)
*G06T 11/00*     (2006.01)
(Continued)

(52) U.S. Cl.
CPC ..... *G02B 27/0179* (2013.01); *G02B 27/0101* (2013.01); *G06T 11/00* (2013.01);
(Continued)

(58) Field of Classification Search
CPC ............ G02B 27/0179; G02B 27/0101; G02B 2027/014; G06T 11/00; G06T 2207/30252;
(Continued)

(56) References Cited

U.S. PATENT DOCUMENTS

| | | | | |
|---|---|---|---|---|
| 2003/0097477 | A1* | 5/2003 | Vossler | H04L 12/4612 709/248 |
| 2010/0109908 | A1* | 5/2010 | Miura | B60R 16/0232 340/905 |

(Continued)

FOREIGN PATENT DOCUMENTS

| | | |
|---|---|---|
| JP | 2009122034 A | 6/2009 |
| JP | 2014211787 A | 11/2014 |

(Continued)

OTHER PUBLICATIONS

"Development of Interlayer film to meet the demands to increase the amount of Information displayed on a vehicle windshield", SEKISUI Chemical Co., Ltd., What's New Archive, "Press Release", Dec 8, 2015, 4 pages, <http://www.sekisuichemical.com/about/whatsnew/2015/1275380_23622.html>.

(Continued)

*Primary Examiner* — Ke Xiao
*Assistant Examiner* — Kim Thanh T Tran
(74) *Attorney, Agent, or Firm* — William H. Hartwell

(57) ABSTRACT

In one embodiment, in accordance with the present invention, a method, computer program product, and system for an in-vehicle content display using augmented reality. The method includes detecting a traffic signal. The method further includes, in response to detecting the traffic signal, calculating a safety degree of a vehicle. The method further includes calculating based on a position of the traffic signal, a display area for projecting content, in accordance with the safety degree onto a front glass of the vehicle. The method further includes determining whether to project content in the display area in accordance with the safety degree.

18 Claims, 18 Drawing Sheets

(51) Int. Cl.
  *G06K 9/00* (2006.01)
  *G06T 7/70* (2017.01)
  *B60R 1/00* (2006.01)
(52) U.S. Cl.
  CPC .......... *B60R 1/00* (2013.01); *B60R 2300/205* (2013.01); *B60R 2300/30* (2013.01); *G02B 2027/014* (2013.01); *G06K 9/00818* (2013.01); *G06K 9/00825* (2013.01); *G06T 7/70* (2017.01); *G06T 2207/30252* (2013.01)
(58) Field of Classification Search
  CPC . G06T 7/70; B60R 2300/30; B60R 2300/205; B60R 1/00; G06K 9/00818; G06K 9/00825
  USPC ........................................................ 345/633
  See application file for complete search history.

(56) References Cited

U.S. PATENT DOCUMENTS

| | | | |
|---|---|---|---|
| 2013/0057638 A1* | 3/2013 | Tamkivi | ............... H04L 65/604 348/14.02 |
| 2013/0293582 A1 | 11/2013 | Ng-Thow-Hing et al. | |
| 2016/0086305 A1 | 3/2016 | Watanabe | |
| 2016/0205246 A1 | 7/2016 | Sim et al. | |
| 2016/0288789 A1* | 10/2016 | Durgin | ............ B60W 30/18154 |
| 2016/0328975 A1* | 11/2016 | Tokita | ................ G06K 9/00805 |
| 2017/0013188 A1* | 1/2017 | Kothari | ............... B60R 11/0235 |
| 2017/0155867 A1 | 6/2017 | Yokota et al. | |
| 2018/0299285 A1* | 10/2018 | Morita | ............ G08G 1/096741 |

FOREIGN PATENT DOCUMENTS

| | | |
|---|---|---|
| JP | 2015146144 A | 8/2015 |
| WO | 2016002007 A1 | 1/2016 |
| WO | 2017095790 A1 | 6/2017 |

OTHER PUBLICATIONS

Zedloptima, "Best HUD—Head Up Display for Car, Vehicle 2018—Most Safety Automobile Device", YouTube video, published on Feb. 14, 2018, 2 pages, <https://www.youtube.com/watch?v=qrBhC3WaTWA>.

* cited by examiner

| SIGNAL STATE 802 | VEHICLE TRAVELING STATE 804 | NEARBY VEHICLE DETECTION 806 | ENVIRONMENT 810 | WEATHER CONDITION 812 | SAFETY DEGREE 814 |
|---|---|---|---|---|---|
| GREEN LIGHT | - | - | - | - | DANGER |
| YELLOW LIGHT | TRAVELING | - | - | - | DANGER |
| YELLOW LIGHT | LOW SPEED | YES | - | - | DANGER |
| YELLOW LIGHT | LOW SPEED | NO | - | - | SAFETY (LOW) |
| YELLOW LIGHT | DECELERATING | - | - | - | SAFETY (LOW) |
| RED LIGHT | TRAVELING | - | - | - | DANGER |
| RED LIGHT | LOW SPEED | YES | - | - | DANGER |
| RED LIGHT | LOW SPEED | NO | - | - | SAFETY (LOW) |
| RED LIGHT | DECELERATING | - | - | - | SAFETY (LOW) |
| RED LIGHT | STOPPING | - | MANY | - | SAFETY (MIDDLE) |
| RED LIGHT | STOPPING | - | FEW | GOOD | SAFETY (HIGH) |
| RED LIGHT | STOPPING | - | FEW | NOT GOOD | SAFETY (MIDDLE) |
| RED LIGHT | STOPPED (PKB ON) | - | - | - | SAFETY (HIGH) |

FIG. 8

IN-VEHICLE CONTENT DISPLAY APPARATUS

BACKGROUND

The present invention relates generally to the field of augmented reality, and more particularly to an in-vehicle content display using augmented reality.

Augmented reality, also referred to as mixed reality and computer-mediated reality, presents a user with an on-going interactive experience of a real-world environment whereby one or more objects that reside in the real-world can be "augmented" with the use of computer-generated perceptual information. In some cases, the computer-generated perceptual information can include multiple sensory modalities, such as visual, auditory, haptic, somatosensory (i.e., a sensation such as pressure, pain, or warmth), and olfactory information that is overlaid on the real-world environment. The overlaid sensory information is seamlessly interwoven with the physical world such that it is perceived as an immersive aspect of the real environment.

An automotive heads-up display, also referred to as an auto-HUD, is a transparent display that presents data in the automobile, generally without requiring users to look away from their usual viewpoints.

SUMMARY

Embodiments of the present invention disclose a method, computer program product, and system for an in-vehicle content display using augmented reality. The method includes detecting a traffic signal. The method further includes, in response to detecting the traffic signal, calculating a safety degree of a vehicle. The method further includes calculating based on a position of the traffic signal, a display area for projecting content in accordance with the safety degree onto a front glass of the vehicle. The method further includes determining whether to project the content in the display area in accordance with the safety degree.

BRIEF DESCRIPTION OF THE DRAWINGS

FIG. 8 is a table depicting exemplary safety degrees by a content display managing software, inserted on the computer within the augmented reality processing environment of FIG. 1, in an embodiment in accordance with the present invention.

DETAILED DESCRIPTION

Embodiments in accordance with the present invention recognize that receiving text messages or other notifications while driving creates a dangerous condition. Embodiments of the present invention recognize that a user of a device may be capable of safely receiving a message or phone call while operating a vehicle under safe conditions, such as when the vehicle is stopped. However, embodiments of the present invention also recognize that in some conditions, the user will be unable to safely perform operations associated with operating a vehicle and receiving a message/phone call at the same time. Embodiments of the present invention assess the conditions under which a vehicle is being operated and determine a safety state. Based upon a calculated safety degree for the determined safety state, embodiments of the invention determine whether to deliver, delay, or dismiss delivery of a message/phone call to ensure the safety of the driver, passengers, and other motorists.

Figure 1:
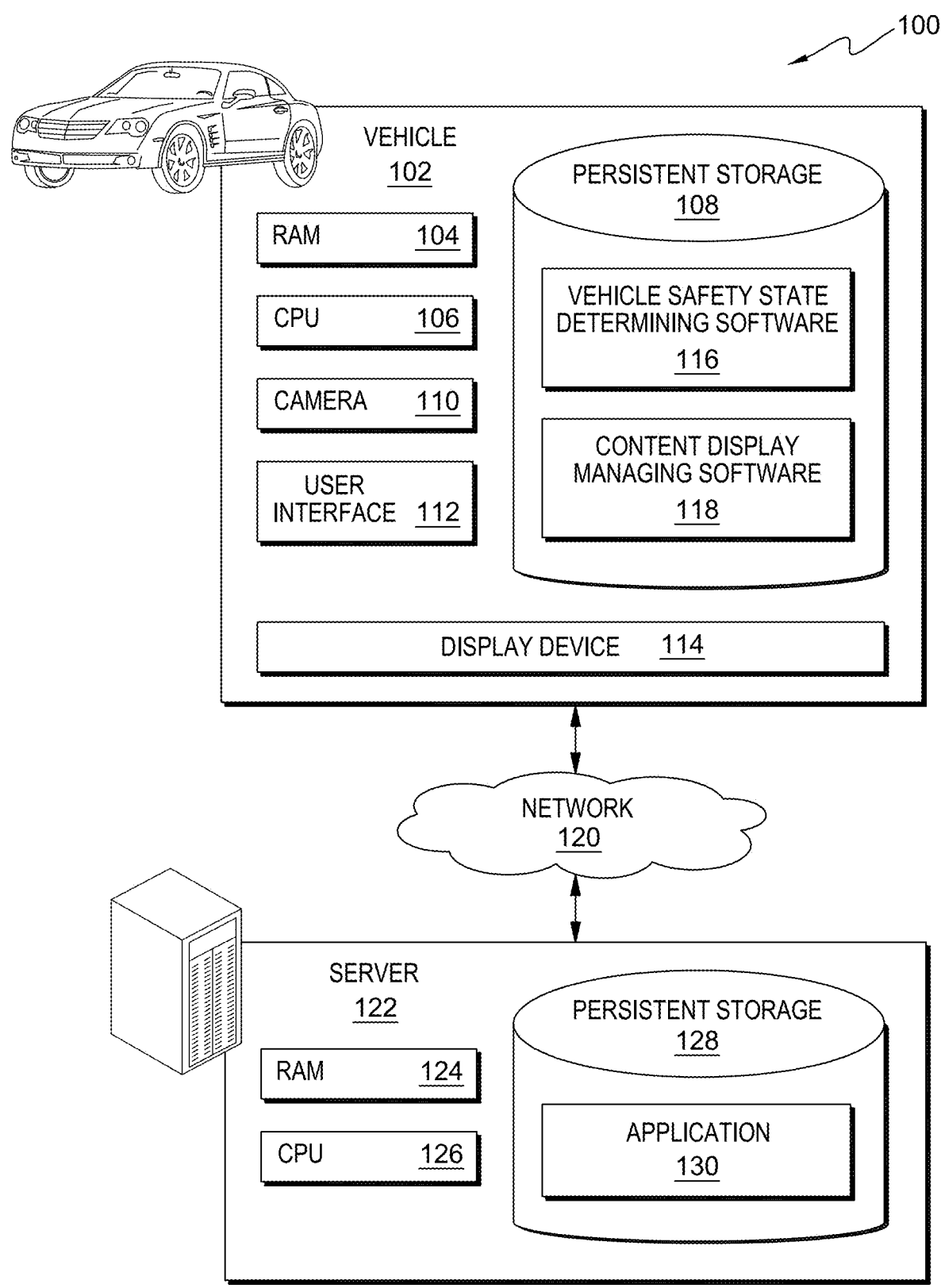
FIG. 1 is a functional block diagram illustrating an augmented reality processing environment, in an embodiment in accordance with the present invention.

Embodiments in accordance with the present invention will now be described in detail with reference to the Figures. FIG. 1 is a functional block diagram, generally designated 100, illustrating an augmented reality processing environment, in an embodiment in accordance with the present invention.

Augmented reality processing environment 100 includes vehicle 102, server 122, and other computing devices (not shown), all interconnected over network 120. Vehicle 102 includes random access memory (RAM) 104, central processing unit (CPU) 106, persistent storage 108, camera 110, user interface 112, and display device 114. Vehicle 102 may contain a Web server, or any other electronic device or computing system, capable of processing program instructions and receiving and sending data. In some embodiments, components of vehicle 102 may include a laptop computer, a tablet computer, a netbook computer, a personal computer (PC), a desktop computer, a personal digital assistant (PDA), a smart phone, or any programmable electronic device capable of communicating over a data connection to network 120. In other embodiments, vehicle 102 may utilize multiple server computing systems comprised of multiple computers as a server system, such as in a distributed computing environment. In general, vehicle 102 is representative of any electronic device or combinations of electronic devices capable of executing machine-readable program instructions and communicating with server 122 via network 120 and with various components and devices (not shown) within augmented reality processing environment 100.

Vehicle 102 includes persistent storage 108. Persistent storage 108 may, for example, be a hard disk drive. Alternatively, or in addition to a magnetic hard disk drive, persistent storage 108 may include a solid state hard drive, a semiconductor storage device, read-only memory (ROM), erasable programmable read-only memory (EPROM), flash memory, or any other computer-readable storage medium that is capable of storing program instructions or digital information. Vehicle safety state determining software 116 and content display managing software 118 are stored in persistent storage 108. Persistent storage 108 also includes operating system software (not shown) that allows vehicle 102 to communicate with server 122 and other computing devices (not shown) of augmented reality processing environment 100 over a data connection on network 120. In other example embodiments, vehicle safety state determining software 116 and content display managing software 118 may be components of operating system software (not shown).

Vehicle safety state determining software 116 is a computer program, or set of computer programs, that is stored in persistent storage 108. Vehicle safety state determining software 116 enables vehicle 102 to determine the safety state of vehicle 102 to determine whether to display a received communication for one or more occupants of vehicle 102 and communicate with server 122 and other computing devices (not shown) of augmented reality processing environment 100 over a data connection on network 120. For example, upon receiving a text message intended for a driver of vehicle 102, vehicle safety state determining software 116 can determine the current vehicle safety state (e.g., if vehicle 102 is moving, decelerating in response a yellow traffic signal at an intersection, or if vehicle 102 is currently stopped). If the safety state of vehicle 102 is determined to be safe, vehicle safety state determining software 116 can then transmit the received text to content display managing software 118 to be displayed to the driver of vehicle 102. In another example embodiment, vehicle safety state determining software 116 can be a cloud service that directs all data (e.g., communications such as text messages, phone calls, etc.), to and from vehicle 102. In other example embodiments, vehicle safety state determining software 116 and content display managing software 118 may be components of an operating system software.

Content display managing software 118 is a computer program, or set of computer programs, that is stored in persistent storage 108. Content display managing software 118, displays received content to an occupant of vehicle 102, based on the current safety state, and communicates with server 122 and other computing devices (not shown) of augmented reality processing environment 100 over a data connection on network 120. For example, upon receiving the received text message for the driver of vehicle 102, content display managing software 118 can then determine one or more red traffic signals, one or more road signs, and/or one or more optical beacons, the position of the one or more red traffic signals, the one or more road signs, and/or the one or more optical beacons using one or more captured images and/or video in front of vehicle 102. An optical beacon is an intentionally conspicuous device designed to attract attention to a specific location. For example, an optical beacon may be a sign indicating road construction that incorporates flashing yellow lights to attract the attention of drivers. Other examples of optical beacons include vehicular beacons comprised of rotating or flashing lights affixed on or to the top of a vehicle to attract the attention of surrounding vehicles and pedestrians (e.g., vehicle tail lights, emergency vehicles such as fire engines, ambulances, police cars, tow trucks, constructions vehicles, and snow removal vehicles). In another example embodiment, information relating to the red traffic signal can be obtained through an optical beacon such as the tail lights of a large size vehicle that may be traveling in front of vehicle 102. Content display managing software 118 can then display the received text message, on the front windshield for the driver of vehicle 102, without hiding, or preventing the driver of vehicle 102 from viewing, the one or more red traffic signals, the one or more road signs, and/or the one or more optical beacons. In other example embodiments, content display managing software 118 can detect, or recognize, one or more voice commands and/or hand gestures from the driver of vehicle 102 in regard to the received text message. For example, upon displaying the received text message, content display managing software 118 can detect and recognize a voice command from the driver of vehicle 102 to display the next received text message, stop displaying the received text message, etc.

Camera 110 is also included in vehicle 102 and is used to capture one or more images and/or video in front of vehicle 102 to determine one or more red traffic signaling devices and/or one or more road signs, and the position of the one or more red traffic signaling devices and the one or more road signs in front of vehicle 102. There can be more than one camera 110 contained in vehicle 102. For example, camera 110 can include one or more cameras that can determine the view of the front side of vehicle 102. For example, vehicle 102 can contain the one or more cameras in an overhead console area, or in a rear-view mirror that continuously views the area (e.g., the view a driver of vehicle 102 will see), in the front side of vehicle 102. In one example embodiment, a driver of vehicle 102 can wear camera 110 on his/her person that can continuously capture the forward-facing view that the driver of vehicle 102 can see. In one example embodiment, camera 110 continuously captures one or more images and/or videos of the area in front of vehicle 102 and with the surrounding environment on all sides of vehicle 102 (e.g., from multiple directions). For example, while a user of vehicle 102 is parked at a scenic overlook, content display managing software 118 can display one or more received communications on the front windshield, or side windows. In another example embodiment, camera 110 is mounted on a 3-axis gimbal and captures images from all sides as the driver of vehicle 102 turns his/her head to look in different directions. Content display managing software 118 can then display received communications on any window surface based on the vehicle safety degree.

Vehicle 102 also includes user interface 112. User interface 112 is a program that provides an interface between a user of vehicle 102 and a plurality of applications that may reside in vehicle 102 (e.g., content display managing software 118), and/or applications on computing devices that may be accessed over a data connection on network 120. A user interface, such as user interface 112, refers to the information (e.g., graphic, text, sound) that a program presents to a user and the control sequences the user employs to control the program. User interface 112 is a type of interface that allows users to interact with peripheral devices (i.e., external computer hardware that provides input and output for a computing device, such as a keyboard and mouse, or touch control) through graphical icons and visual indicators as opposed to text-based interfaces, typed command labels, or text navigation. The actions in GUIs are often performed through direct manipulation of the graphical elements. A variety of types of user interfaces exist. In one embodiment, user interface 112 is a graphical user interface (GUI). In another embodiment, user interface 112 may be a web user interface (WUI) and can display text, documents, web browser windows, user options, application interfaces, and instructions for operation, and includes the information (such as graphic, text, and sound) that a program presents to a user and the control sequences the user employs to control the program. User interface 112 may also be mobile application software that provides an interface between a user of vehicle 102 and server 122, and other devices (not shown), over a data connection on network 120. Mobile application software, or an "app," is a computer program designed to run on smart phones, tablet computers and other mobile devices. User interface 112 enables a user of vehicle 102, and content display managing software 118, to capture, and/or receive, and render images using display device 114. For example, while waiting with a child in a parked instance of vehicle 102, the child can use user interface 112 to draw (e.g., doodle), on one or more windows of vehicle 102. For example, images that are drawn on user interface 112 are displayed on the one or more windows of vehicle 102 using display device 114.

Vehicle 102 also includes display device 114. Display device 114 is used by content display managing software 118 to project, or display, images onto one or more windows of vehicle 102. In one example embodiment, display device is comprised of one or more lasers that reflect laser light off a mirror and onto the windshield. In another example embodiment, display device 114 includes a self-luminous intermediate layer within the windshield that becomes irradiated with laser light and is visible at all angles within vehicle 102. For example, a passenger in the back seat of vehicle 102 can see the irradiated characters/images displayed on the front windshield of vehicle 102. In other example embodiments, display device 114 can be an array of projectors located in the dash of vehicle 102 that augment, or overlay, information that appears to a driver of vehicle 102 as seamlessly interwoven with the physical world such that the information is perceived as an immersive aspect of the real environment. Vehicle 102 may include internal and external hardware components, as depicted and described in further detail with respect to FIG. 10.

In FIG. 1, network 120 is shown as the interconnecting fabric between vehicle 102, server 122, and with various components and devices (not shown) within augmented reality processing environment 100. In practice, the connection may be any viable data transport network, such as, for example, a LAN or WAN. Network 120 can be for example, a local area network (LAN), a wide area network (WAN) such as the Internet, or a combination of the two, and include wired, wireless, or fiber optic connections. In general, network 120 can be any combination of connections and protocols that will support communications between vehicle 102, server 122, and with various components and devices (not shown) within augmented reality processing environment 100.

Server 122 is included in augmented reality processing environment 100. Server 122 includes random access memory (RAM) 124, central processing unit (CPU) 126, and persistent storage 128. Server 122 may be a Web server, or any other electronic device or computing system, capable of processing program instructions and receiving and sending data. In some embodiments, server 122 may be a laptop computer, a tablet computer, a netbook computer, a personal computer (PC), a desktop computer, a personal digital assistant (PDA), a smart phone, or any programmable electronic device capable of communicating over a data connection to network 120. In other embodiments, server 122 may represent server computing systems utilizing multiple computers as a server system, such as in a distributed computing environment. In general, server 122 is representative of any electronic devices or combinations of electronic devices capable of executing machine-readable program instructions and communicating with vehicle 102 via network 120 and with various components and devices (not shown) within augmented reality processing environment 100.

Server 122 includes persistent storage 128. Persistent storage 128 may, for example, be a hard disk drive. Alternatively, or in addition to a magnetic hard disk drive, persistent storage 128 may include a solid state hard drive, a semiconductor storage device, read-only memory (ROM), erasable programmable read-only memory (EPROM), flash memory, or any other computer-readable storage medium that is capable of storing program instructions or digital information. Application 130 is stored in persistent storage 128, which also includes operating system software, as well as software that enables server 122 to detect and establish a connection to vehicle 102 and communicate with other computing devices (not shown) of augmented reality processing environment 100 over a data connection on network 120. In one example embodiment, application 130 can be a mail application that can send and receive emails to/from the driver of vehicle 102. In other example embodiments, application 130 can be a text messaging application that can exchange text messages with the driver of vehicle 102 via a smartphone (not shown).

Figure 2:
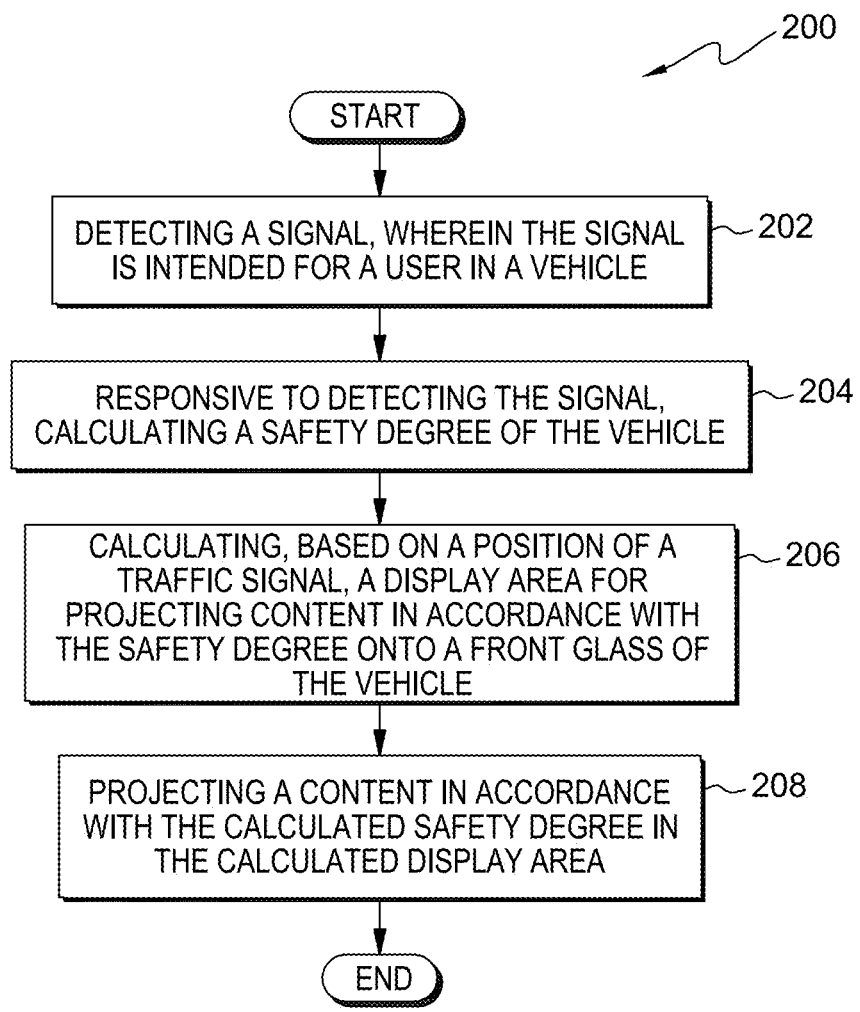
FIG. 2 is a flowchart depicting operational steps of a content display managing software, on a computer within the augmented reality processing environment of FIG. 1, in an embodiment in accordance with the present invention.
Figure 3:
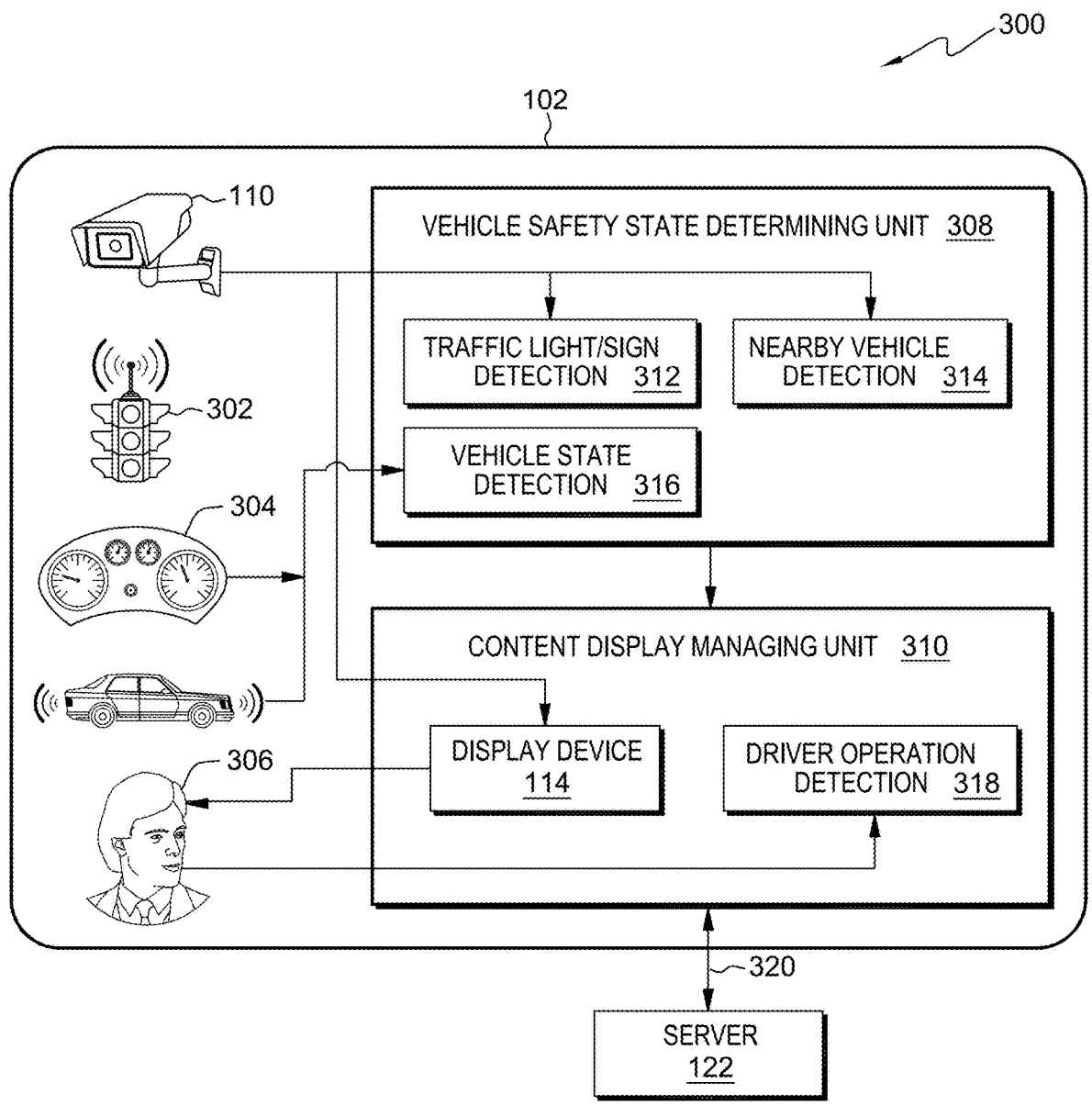
FIG. 3 is a configuration diagram depicting components performing the operational steps of a content display managing software, on a computer within the augmented reality processing environment of FIG. 1, in an embodiment in accordance with the present invention.

FIG. 2 is a flowchart, generally designated 200, depicting operational steps of a content display managing software, on a computer within the augmented reality processing environment of FIG. 1, in an embodiment in accordance with the present invention. FIG. 3 is a configuration diagram, generally designated 300, depicting components performing the operational steps of the content display managing software, on a computer within the augmented reality processing environment of FIG. 1, in an embodiment in accordance with the present invention. FIG. 2 and FIG. 3 will now be discussed over the course of the following paragraphs.

In an example embodiment, content display managing software 118 detects a signal, wherein the signal is a communication that is intended for a user in a vehicle as depicted in step 202 and reference indicator 320 illustrated in FIG. 3. For example, content display managing software 118 receives a text message from server 122 while the driver is operating vehicle 102. For example, content display managing software 118 can receive the text message via a smartphone that is connected to content display managing unit 310 over a Bluetooth® connection on network 120. In other example embodiments, content display managing software 118 can receive the text message using a cellular subscription service built in to vehicle 102.

In step 204, responsive to detecting the signal, content display managing software 118 calculates a safety degree of vehicle 102. A safety degree is a calculated level of safety for the occupants of vehicle 102 based on the determined vehicle traveling state. For example, content display managing software 118 can request a current safety degree of vehicle 102 from vehicle safety state determining unit 308 that executes vehicle safety state determining software 116. Vehicle safety state determining software 116 calculates a safety degree based on the traveling state of vehicle 102, a status of one or more traveling vehicles in the proximity of vehicle 102, the traveling environment that can convey traffic information that is relevant to vehicle 102 such as one or more traffic signals, one or more road signs, and a weather condition. For example, if vehicle safety state determining software 116 determines, using one or more sensors via vehicle state detection 316, that the driver of vehicle 102 currently has his/her foot on the accelerator, and vehicle 102 is currently accelerating, as determined via sensor 304 and vehicle state detection 316, then the calculated safety degree indicates a danger safety state and (in subsequent operations/steps) content is not displayed by display device 114 on the front windshield for driver 306 to see. In another example, the driver of vehicle 102 is approaching a yellow instance of traffic signal 302, as detected by camera 110 and traffic light/sign detection 312. Additionally, no other vehicles are detected around (e.g., in front of, next to, or behind vehicle 102), using nearby vehicle detection 314, and vehicle 102 is decelerating, as indicated by sensor 304 and vehicle state detection 316, due to driver 306 pressing on the brake using his/her foot. Vehicle safety state determining software 116 may then calculate a low safety degree, and therefore (in subsequent operations/steps) cause an icon to be displayed to indicate to driver 306 that a text message was received. In yet another example, where vehicle safety state determining software 116 calculates a high safety state (e.g., vehicle 102 is stopped at a red traffic signal), the entire body of the text message can be displayed to driver 306 on the front windshield of vehicle 102 (in subsequent operations/steps). In the example embodiment of FIG. 3, sensor 304 can track the speed of vehicle 102, determine if the brake/accelerator pedal is being pressed, if the traction control system is enabled, if the anti-lock brake system (ABS) is activated, and/or if the cruise control system is activated. In general, sensor 304 can read and interpret information from any sensor contained in vehicle 102. The calculated vehicle safety degree is described in further detail with respect to FIG. 8, below.

Content display managing software 118 calculates, based on a position of a traffic signal, a display area for projecting content in accordance with the safety degree onto a front glass of the vehicle as depicted in step 206. For example, using content display managing unit 310, content display managing software 118 detects traffic signal 302 as driver 306 stops vehicle 102 at an intersection. Content display managing software 118 determines a display area on the front windshield of vehicle 102 by marking an area of an effective visual field having a center at the position of traffic signal 302. For example, camera 110 captures a continuous video stream of traffic signal 302, wherein traffic signal 302 is positioned at the center of the video stream. In one example embodiment, the effective visual field is defined as a region that is approximately 30 degrees in a horizontal direction and approximately 20 degrees in a vertical direction in which information can be received instantaneously only with ocular motion of driver 306. In another example embodiment, content display managing software 118 can exclude from the determined area, superposition forbidden objects (e.g., to not place content on top of forbidden objects such as traffic signals, such as traffic signal 302, road signs, traffic beacons, destination markers (e.g., buildings and billboards), and signboards identifying buildings and/or locations). For example, content display managing software 118 can then exclude (e.g., remove) from the display area forbidden objects by superimposing a rectangular region (not viewable by driver 306), over or around the forbidden objects in the display area. In one example embodiment, forbidden objects (that is, objects that should not be obstructed by information displayed in the display area) include traffic signals, such as traffic signal 302, road signs, traffic beacons, destination markers (e.g., buildings and billboards), and signboards identifying buildings and/or locations. In other example embodiments, driver 306 can manually configure additional forbidden objects using user interface 112. Content display managing software 118 can then calculate a set of rectangular regions included in the display area after the removal of the forbidden objects. For example, content display managing software 118 determines a set of rectangular areas within the display area that do not overlap with the removed forbidden objects. Content display managing software 118 can then exclude any rectangular region having a height and width less than a certain height and width from among the set of rectangular regions. For example, content display managing software 118 determines a required size based on the received text message, and then compares the set of rectangular regions within the display area with the required size of the received text message. In other example embodiments, where a large-size vehicle can block the front view of traffic signal 302, content display managing software 118 can calculate the display area based on the position of a rear body of the large-size vehicle. For example, content display managing software 118 can determine a display area on the back of the large-size vehicle, wherein content display managing software 118 determines a display area that does not cover the tail lights of the large-size vehicle.

In step 208, content display managing software 118 projects the content in accordance with the calculated safety degree in the calculated display area. For example, upon determining the required size of a rectangular region based on the received text message, content display managing software 118 can display the received text message in the rectangular region that closely matches the required size of the received text message. In another example embodiment, content display managing software 118 can use driver operation detection 318 to recognize voice commands and/or gestures from driver 306. For example, upon projecting a first content in a set of received content, driver operation detection 318 detects a hand gesture of driver 306, wherein driver 306 moves his/her hand in a swiping action, causing content display managing software 118 to display the next content in the received set of contents. In another example embodiments, content display managing software 118 can use driver operation detection 318 to detect and recognize a voice command from driver 306. For example, as driver 306 approaches traffic signal 302, content display managing software 118 displays an icon on the front windshield as a result of a low calculated vehicle safety degree. As driver 306 stops vehicle 102 at traffic signal 302, driver 306 can speak a voice command such as "play voicemail." As a result, content display managing software 118 plays the received voicemail message. In other example embodiments, content display managing software 118 can issue recognized voice commands and/or gestures from driver 306 to one or more external applications. For example, the recognized voice commands and/or gestures from driver 306 can execute applications on a Bluetooth® connected smartphone. Additionally, content can be received from the one or more external applications via voice commands and/or gestures from driver 306. For example, the one or more external applications can switch content or stop content from being displayed in accordance with an instruction from content display managing unit 310.

FIGS. 4A through 4E depict a real-world experience of an augmented reality processing environment of FIG. 1, for displaying a received communication in a user's visual field with objects that are not to be obstructed, in an embodiment in accordance with the present invention. FIGS. 4A through 4E will now be discussed over the course of the following paragraphs, with respect to the flowcharts of FIG. 5 and FIG. 6, and referring also to FIG. 1 and FIG. 3, where applicable.

Figure 5:
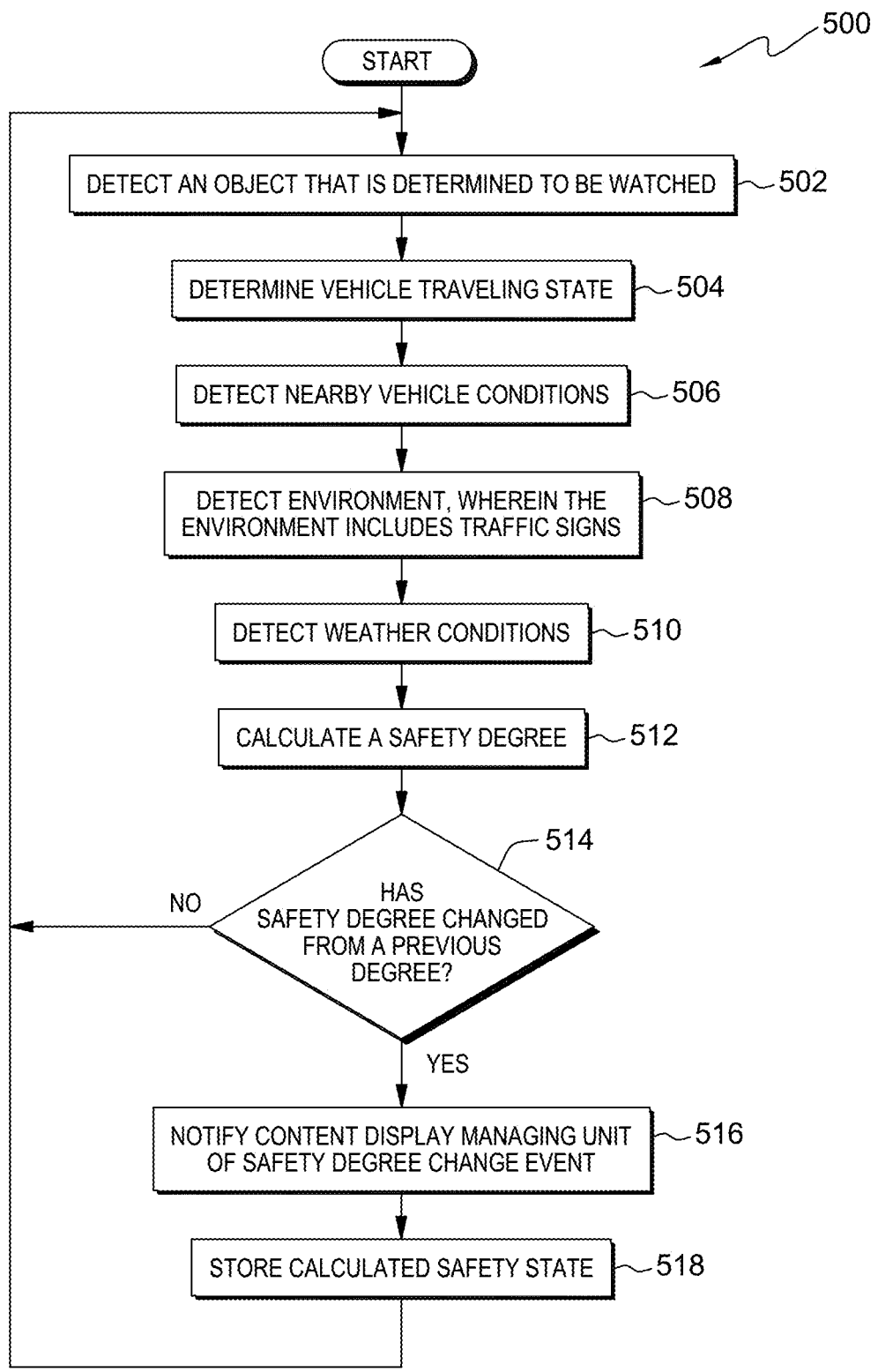
FIG. 5 is a flowchart depicting operational steps of a content display managing software, inserted on the computer within the augmented reality processing environment of FIG. 1, for determining a safety degree, in an embodiment in accordance with the present invention.

FIG. 5 is a flowchart, generally designated 500, depicting operational steps of a content display managing software, on the computer within the augmented reality processing environment of FIG. 1, for determining a safety degree, in an embodiment in accordance with the present invention. In an example embodiment, vehicle safety state determining unit 308, using traffic light/sign detection 312 (see FIG. 3), detects an object that is determined to be watched as depicted in step 502 and illustrated in FIG. 4A. For example, as vehicle 102 approaches traffic stop 401, traffic light/sign detection 312, using camera 110 (see FIG. 1), detects and continuously tracks one or more traffic signals and a road sign occupying traffic stop 401 that are not to be obstructed.

In step 504, vehicle safety state determining unit 308, using vehicle state detection 316 determines the vehicle traveling state of vehicle 102. For example, as vehicle 102 approaches traffic stop 401, vehicle state detection 316 detects that driver 306 is applying pressure on the brake pedal (not shown), as indicated by sensor 304. In one example embodiment, the vehicle traveling state includes the speed of vehicle 102, whether vehicle 102 is accelerating, whether vehicle 102 is decelerating, a level of engagement by driver 306 with the brake pedal or the gas pedal. In other example embodiments, vehicle state detection 316 continuously monitors the operation of vehicle 102. For example, one or more sensors, such as sensor 304, can determine when the accelerator pedal (not shown) is being depressed, when a turn signal is activated to indicate a lane shift, the current state of the vehicle doors and door locks, the current gear selection, and the state of safety belts while vehicle 102 is being operated.

Vehicle safety state determining unit 308, using nearby vehicle detection 314, detects nearby vehicle conditions as depicted in step 506. For example, using camera 110, nearby vehicle detection 314, determines if there are any vehicles traveling in front of, next to (e.g., on the driver side or on the passenger side) and/or behind vehicle 102. In the example embodiment of FIG. 4A, nearby vehicle detection 314 determines that a first vehicle is stopped at traffic stop 401 on the opposing side of traffic, and a second vehicle is in front of vehicle 102 and has passed through traffic stop 401.

Figure 4A:
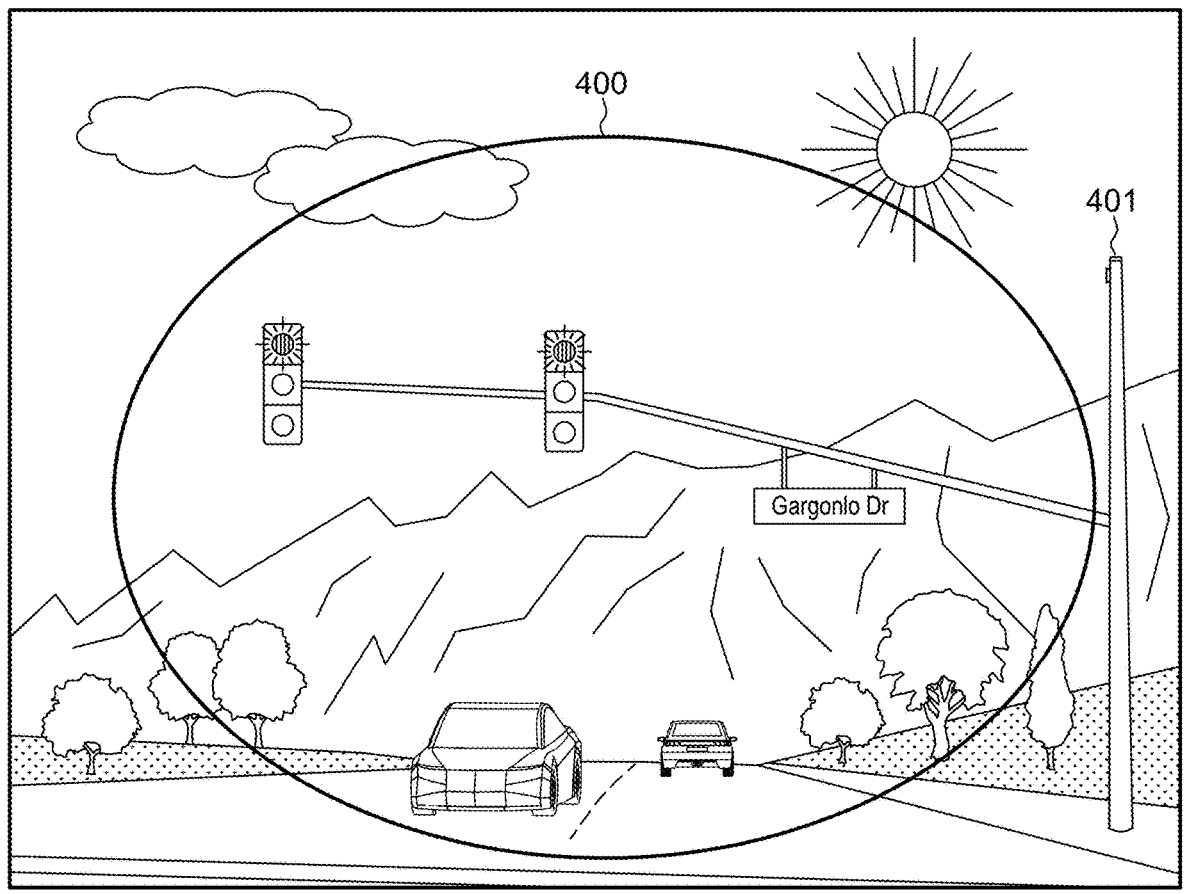
FIGS. 4A through 4E depict a real-world representation of an augmented reality processing environment of FIG. 1, for displaying a received communication in a user's visual field with objects that are not to be obstructed, in an embodiment in accordance with the present invention.
Figure 4B:
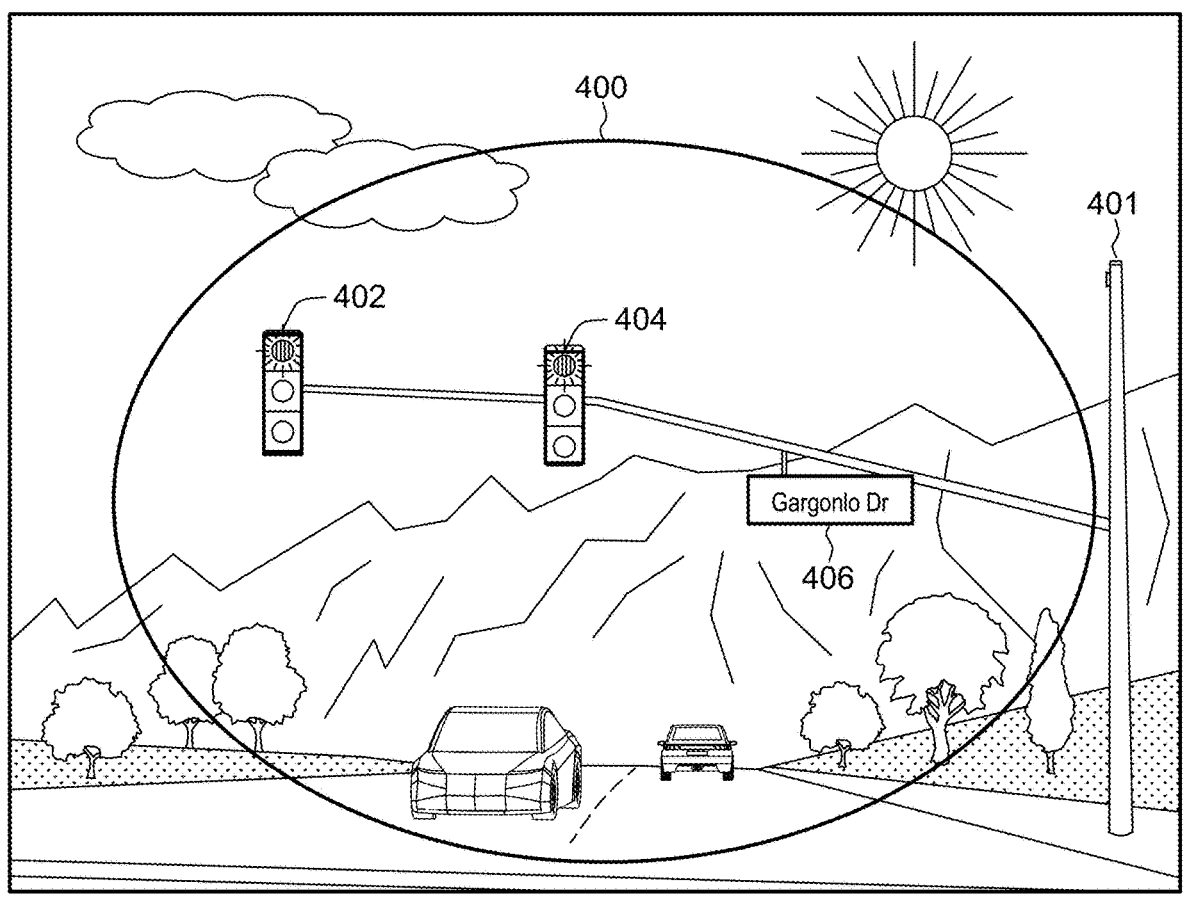

In step 508, vehicle safety state determining unit 308 detects the environment, wherein the environment includes traffic signs. For example, as depicted in FIG. 4B, content display managing unit 310, detects traffic signal 402, traffic signal 404, and road sign 406 as driver 306 and vehicle 102 approaches traffic stop 401. Content display managing unit 310 determines display area 400 on the front windshield of vehicle 102 by marking an area of an effective visual field having a center at or near the position (or the center) of traffic signal 402, traffic signal 404, and road sign 406. For example, camera 110 captures a continuous video stream of traffic signal 402, traffic signal 404, and road sign 406, wherein the center of traffic signal 402, traffic signal 404, and road sign 406 is positioned at the center of the video stream. Content display managing unit 310 can then exclude (e.g., prevent from being obstructed), traffic signal 402, traffic signal 404, and road sign 406 by superimposing a rectangular region (not viewable by driver 306), over or around traffic signal 402, traffic signal 404, and road sign 406 in display area 400 area as depicted in FIG. 4B.

In step 510, vehicle safety state determining unit 308 detects weather conditions. For example, vehicle safety state determining unit 308, using camera 110, determines the current weather conditions vehicle 102 is currently traveling in. For example, vehicle safety state determining unit 308 can determine if the weather is currently raining, a mixed rain/sleet, snowing, if the sky is overcast, if it is night time, and/or if the sun is shining and the skies are clear as illustrated in FIGS. 4A through 4E. In other example embodiments, vehicle safety state determining unit 308 can connect to a weather service (e.g., server 122), to determine current weather conditions using a data connection on network 120.

In step 512, vehicle safety state determining unit 308 calculates a safety degree. For example, vehicle safety state determining unit 308 calculates a safety degree based on the determined vehicle traveling state, the detected nearby vehicle conditions, the detected environment, and the detected weather conditions. For example, as vehicle 102 is approaching traffic stop 401 in FIGS. 4A and 4B, vehicle safety state determining unit 308 determines a "middle" safety degree due to vehicle 102 still being moving as driver 306 is pressing on the brake pedal (not shown). Possible values for the safety degree are described in further detail with respect to FIG. 8, below.

In decision step 514, vehicle safety state determining unit 308 determines if the calculated safety degree has changed from a previous degree. For example, prior to approaching traffic stop 401, the previous calculated safety degree may have been "danger" since the driver of vehicle 102 may have had his/her foot on the accelerator, as detected by sensor 304 and vehicle state detection 316. If vehicle safety state determining unit 308 determines that the calculated safety degree has not changed from a previous degree ("No" branch, decision 514), vehicle safety state determining unit 308 repeats steps 502 through 512 as depicted in FIG. 5. For example, this can occur if there is no change in the current calculated safety degree and the previous calculated safety degree. If vehicle safety state determining unit 308 determines that the calculated safety degree has changed from a previous degree ("Yes" branch, decision 514), vehicle safety state determining unit 308 notifies content display managing unit 310 of a safety degree change event as depicted in step 516. In other example embodiments, the amount of information of the content being projected is increased as the safety degree rises. For example, as vehicle 102 approaches traffic stop 401, vehicle safety state determining unit 308 continuously calculates the safety degree. As vehicle 102 gradually slows down, and comes to a stop, the calculated safety degree gradually rises. As a result, the amount of information displayed to drive 306 increases as the safety degree increases.

In step 516, vehicle safety state determining unit 308 notifies content display managing unit 310 of the safety degree change event. In one example, embodiment, vehicle safety state determining unit 308 can use an application program interface (API) of content display managing unit 310 to indicate the new safety state. In other example embodiments, vehicle safety state determining unit 308 can indicate the new safety state to content display managing unit 310 over a data connection on network 120.

In step 518, vehicle safety state determining unit 308 stores the calculated safety state. For example, vehicle safety state determining unit 308 can store the new safety state in persistent storage 108. In other example embodiments, vehicle safety state determining unit 308 stores the new calculated safety state in a list, contained in persistent storage 108, to provide a history of the safety states of vehicle 102 over a certain time period. For example, some insurance companies offer discounts to drivers for "safe driving" over a period of time. Driver 306 can authorize vehicle safety state determining unit 308 to provide the stored safety states, and data used to determine the stored safety states, to an insurance company to receive a discount on insurance premiums.

Figure 6:
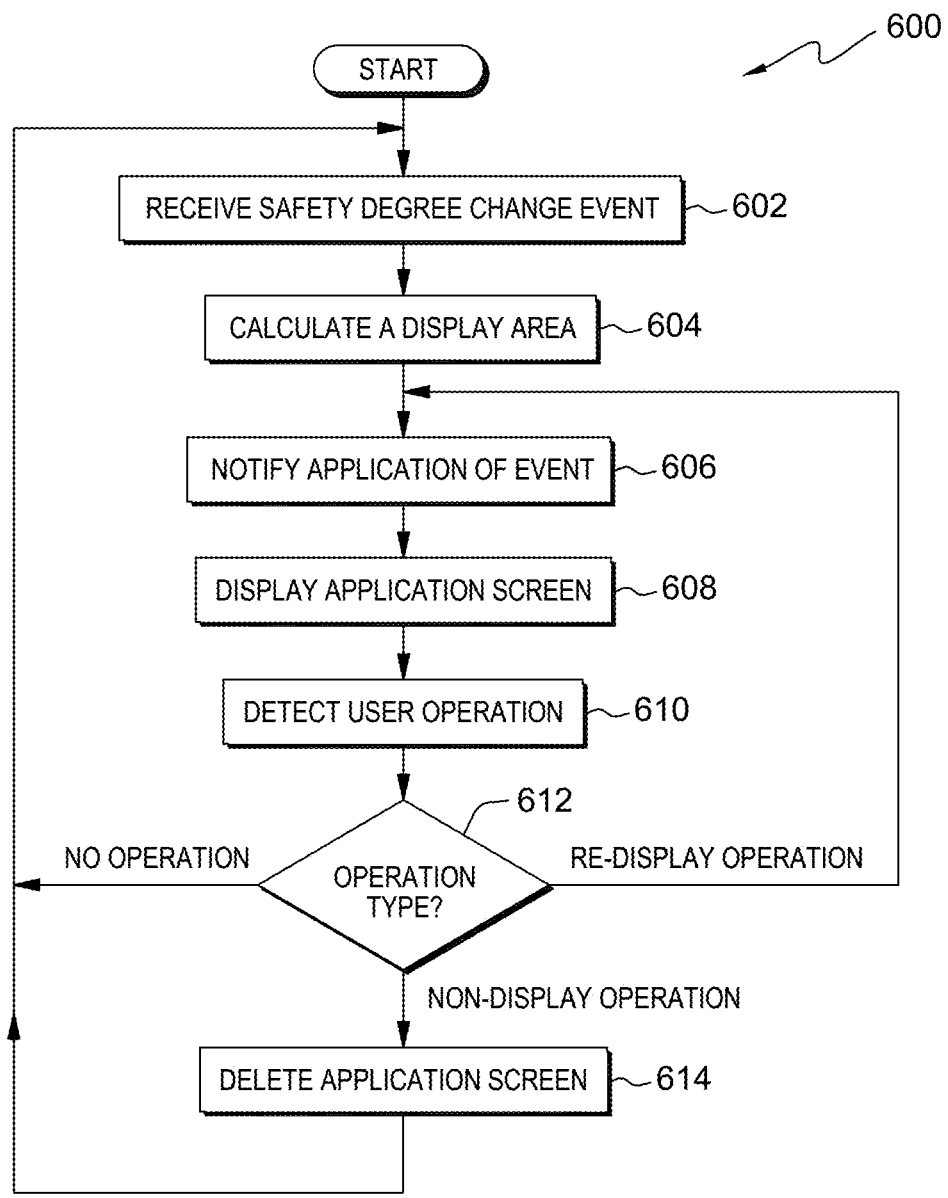
FIG. 6 is a flowchart depicting operational steps of a content display managing software, inserted on the computer within the augmented reality processing environment of FIG. 1, for calculating a display area, in an embodiment in accordance with the present invention.

FIG. 6 is a flowchart, generally designated 600, depicting operational steps of a content display managing software, on the computer within the augmented reality processing environment of FIG. 1, for calculating a display area, in an embodiment in accordance with the present invention. Continuing the example embodiment of FIG. 5, content display managing unit 310 receives a safety degree change event as depicted in step 602. For example, as previously described in step 512, vehicle safety state determining unit 308 determines a "middle" safety degree due to vehicle 102 still moving while driver 306 is pressing on the brake pedal (not shown). Content display managing unit 310 then receives the safety degree change event from vehicle safety state determining unit 308.

In step 604, content display managing unit 310 calculates a display area. For example, as previously described with respect to step 508, content display managing unit 310, detects traffic signal 402, traffic signal 404, and road sign 406 as driver 306 within vehicle 102 approaches traffic stop 401 as illustrated in display area 400 (see FIG. 4B). Content display managing unit 310 determines a display area (e.g., display area 400), on the front windshield of vehicle 102 by marking an area of an effective visual field having a center at the center of the position of traffic signal 402, traffic signal 404, and road sign 406. Content display managing unit 310 can then exclude (e.g., remove forbidden objects), traffic signal 402, traffic signal 404, and road sign 406 by superimposing a rectangular region (not viewable by driver 306), over or around traffic signal 402, traffic signal 404, and road sign 406 in the display area as depicted in FIG. 4B. In another example embodiment, where there is no change in the safety degree by vehicle safety state determining unit 308, content display managing unit 310 may skip steps 602 through 608 and proceed directly to step 610 and detect a user operation. In other example embodiments, a display area may be produced such that an object to be watched is positioned at the boundary of the range of the effective visual field, and a content display region may be maximized while the object is positioned in the visual field (e.g., see FIGS. 7A through 7E).

Figure 4C:
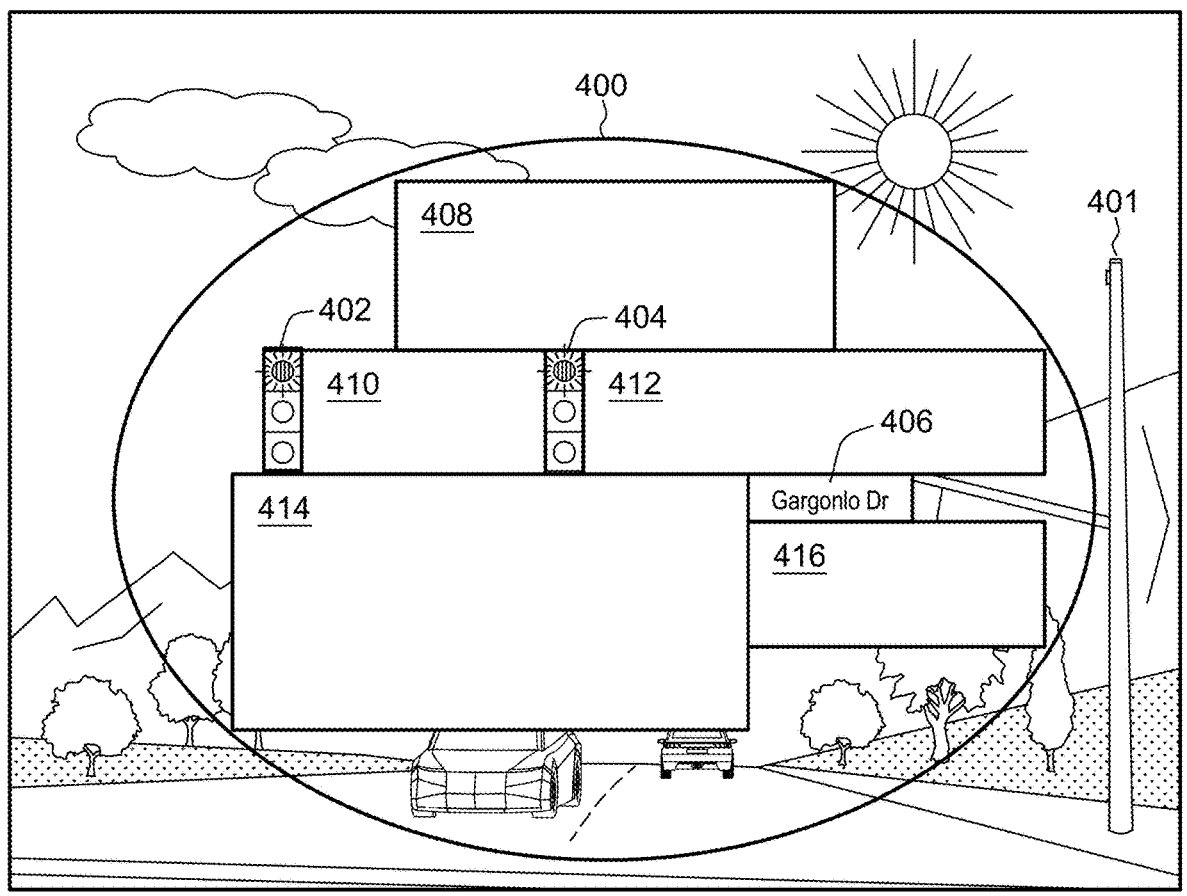
Figure 4D:
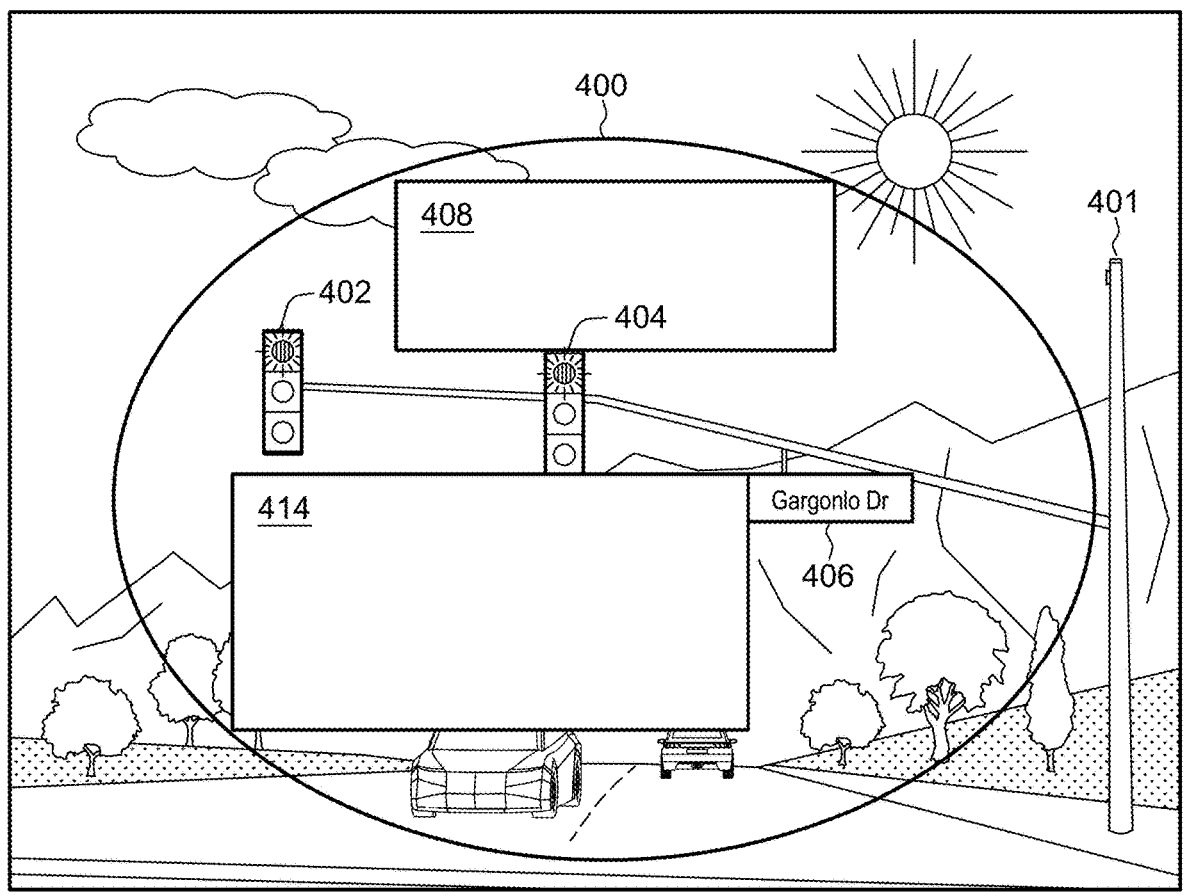
Figure 4E:
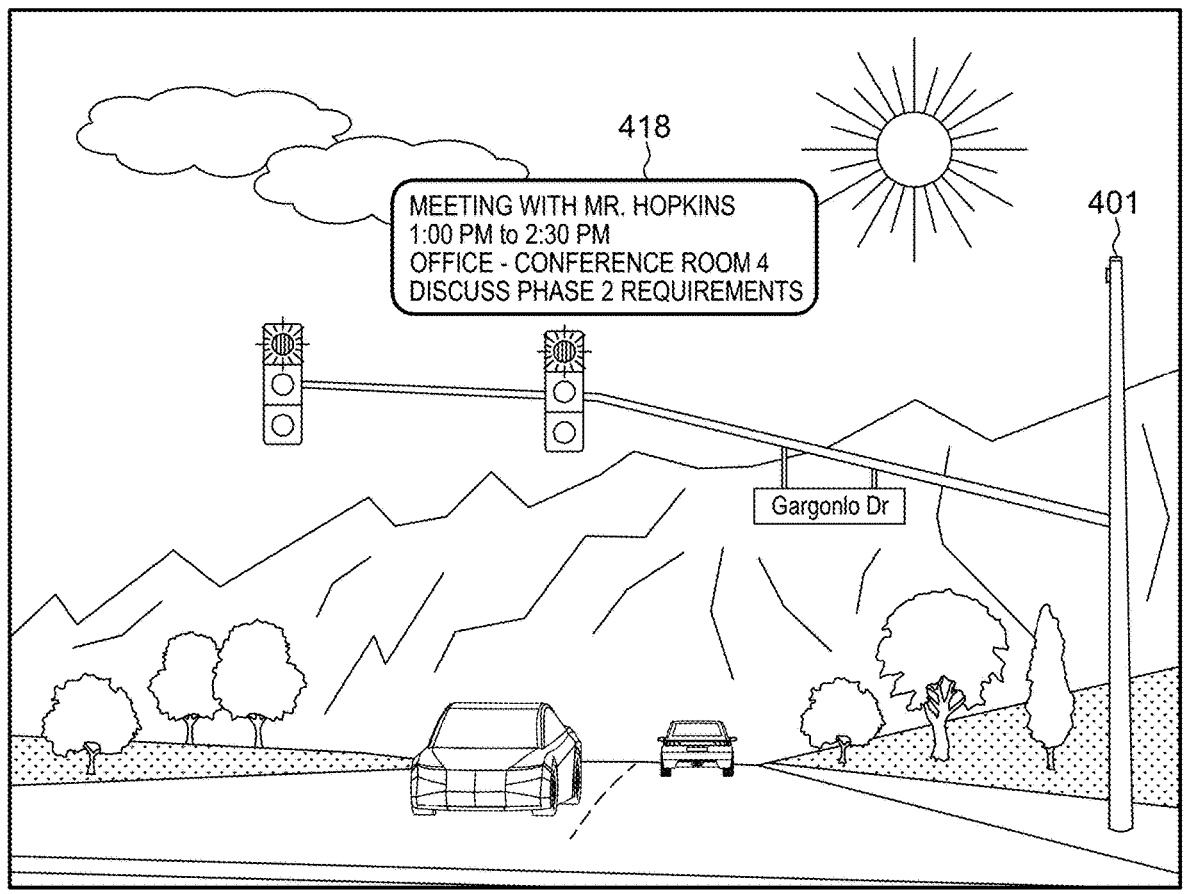

Upon identifying and excluding forbidden objects, content display managing unit 310 then calculates a set of rectangular regions within display area 400 that will be used to display received content to driver 306. For example, as illustrated in FIG. 4C, content display managing unit 310 creates regions 408, 410, 412, 414, and 416 within display area 400 and around traffic signal 402, traffic signal 404, and road sign 406. In one example embodiment, content display managing unit 310 can remove one or more regions in the set of created regions that do not have a certain height and width as depicted in FIG. 4D. For example, content display managing unit 310 removes regions 410, 412, and 416 upon determining that regions 410, 412, and 416 do not meet desired dimensions of the received content. In one example embodiment, content display managing unit 310 can receive requirements for display regions of one or more applications. For example, a smartphone (not picture) can transmit display region requirements to content display managing unit 310 upon pairing up with vehicle 102. The smartphone can transmit required display region requirements for a plurality of mobile applications including display region requirements for a text messaging application and an email application. In other example embodiments, driver 306 can configure content display managing unit 310 to calculate regions that are at least a certain visible distance from the traffic lights, to provide a "buffer" to make sure that the traffic lights are clearly visible. For example, driver 306, using user interface 112, can configure content display managing unit 310 to display content a certain distance from traffic signal 302.

In step 606, content display managing unit 310 notifies an application of the event (e.g., a new calculated safety degree). For example, content display managing unit 310 notifies a text messaging application of a connected smartphone, wherein the notification includes one or more event attributes. In one example embodiment, the event attributes include information on display area 400, regions 408 and 414, and the current safety state of vehicle 102. Upon receiving the event attributes, the smartphone application can establish contents to be displayed based on the one or more attributes. For example, the one or more attributes may include information such as a safety condition determined by vehicle safety state determining unit 308, thereby allowing the smartphone application to perform display control via display device 114. In other example embodiments, the smart phone application transmits one or more received content to content display managing unit 310 upon receiving the one or more event attributes.

In step 608, content display managing unit 310 displays the application screen. For example, content display managing unit 310 can receive the content from the smartphone application and determine the best display region to display the content in, such as display region 408 or display region 414. Content display managing unit 310 compares the received content to the dimensions for display region 408 and display region 414 to determine the best region to contain the received content. Upon determining the region that is closest to the height and width dimension of the received content, content display managing unit 310 displays the content in display region 408 as illustrated by text message 418 in FIG. 4E. In other example embodiments where the safety degree is not suitable to display the entire content, content display managing unit 310 can display an icon to notify driver 306. For example, as in the previous example embodiment of FIG. 5, wherein vehicle safety state determining unit 308 determines a "middle" safety degree due to vehicle 102 still moving, content display managing unit 310 can display an icon as vehicle 102 is stopping. Upon determining vehicle 102 has stopped and determining a new safety degree by vehicle safety state determining unit 308, content display managing unit 310 can then display text message 418.

In step 610, content display managing unit 310 detects a user operation. For example, content display managing unit 310, using camera 110, can detect a hand gesture or a voice command of driver 306. In one example embodiment, content display managing unit 310 detects that driver 306 performs a swiping action to dismiss text message 418, or to view a second content that has not yet been displayed for diver 306. In another example embodiment, content display managing software 118 uses natural language processing to interpret one or more voice commands of driver 306. For example, driver 306 can say "Stop" or "Dismiss" to halt or remove the text message 418. In another example embodiment, driver 306 can access one or more applications on a connected smartphone. For example, driver 306 can say "Open mail" and content display managing software 118 can issue a command to a smartphone (not shown) to open an email application, then display an inbox using display device 114.

In decision step 612, content display managing unit 310 determines the user operation type. For example, content display managing unit 310 determines if the driver 306 performs a hand gesture and/or issues a voice command in response to displayed text message 418, or if driver 306 performs no action. If content display managing unit 310 determines that driver 306 does not perform an operation in response to text message 418 ("No Operation" branch, decision 612), content display managing unit 310 repeats steps 602 through 612 as depicted in FIG. 6. If content display managing unit 310 determines that driver 306 issues a command to "Stop" or "Dismiss" in response to text message 418 ("Non-display Operation" branch, decision 612), content display managing unit 310 removes text message 418 from display area 400 as depicted in step 614. Upon removing text message 418 as depicted in step 614, content display managing unit 310 repeats steps 602 through 612 as depicted in FIG. 6. In another example embodiment, content display managing unit 310 can determine both a spoken voice command and recognized hand gesture from driver 306 simultaneously. If content display managing unit 310 determines that driver 306 issues a command to "Re-display" in response to text message 418 ("Re-display Operation" branch, decision 612), content display managing unit 310 can then re-display a previous content. For example, content display managing unit 310 removes text message 418 after a predetermined amount of time. At a later time, after text message 418 has been removed, content display managing unit 310 detects a voice command from driver 306 to "re-display the previous text message." Content display managing unit 310 can then repeat steps 606 through 612 as depicted in FIG. 6 based on receipt of the re-display operation.

Figure 7A:
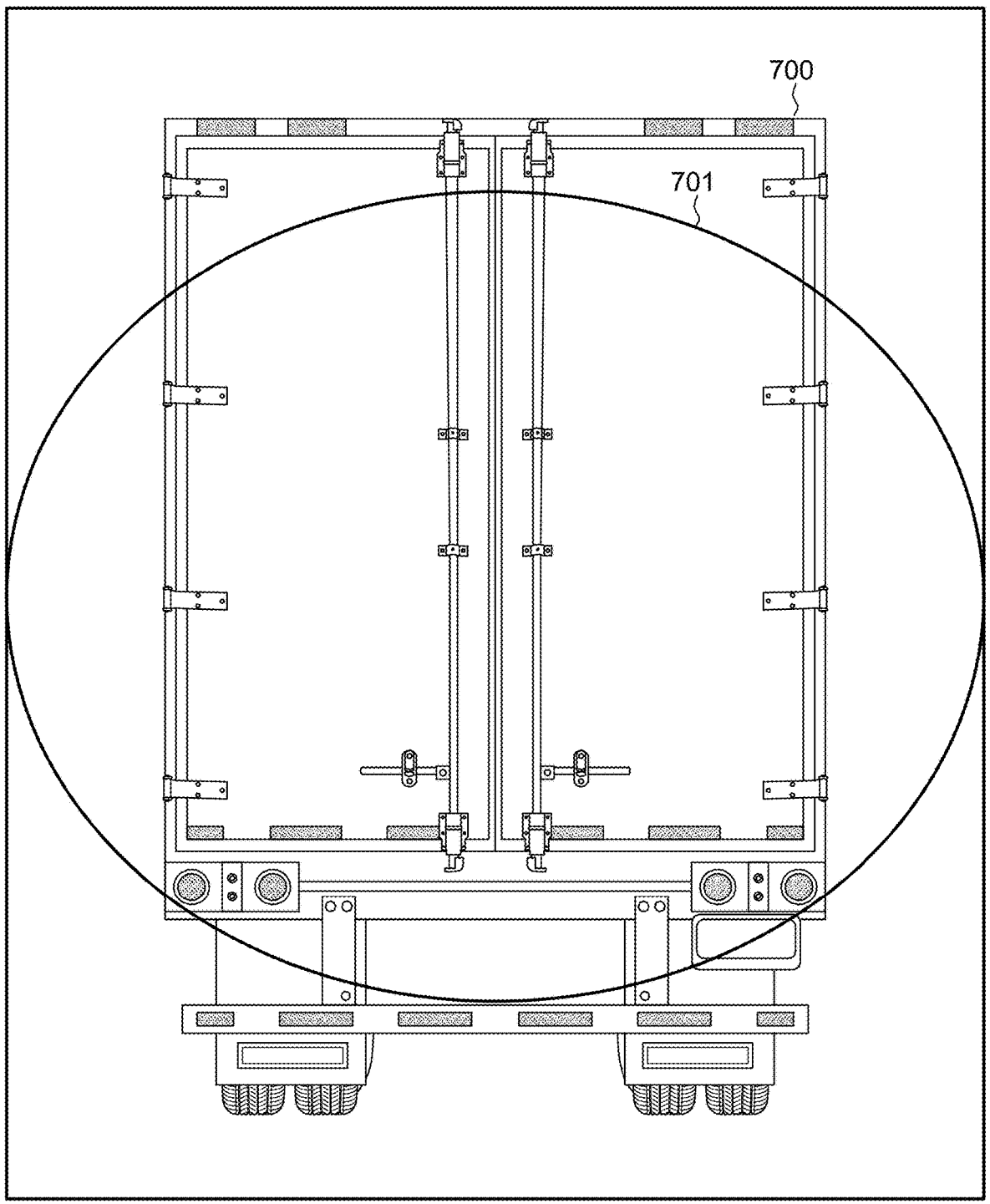
FIGS. 7A through 7E depict a real-world representation of an augmented reality processing environment of FIG. 1, for displaying a received communication on a stationary object, in an embodiment in accordance with the present invention.
Figure 7B:
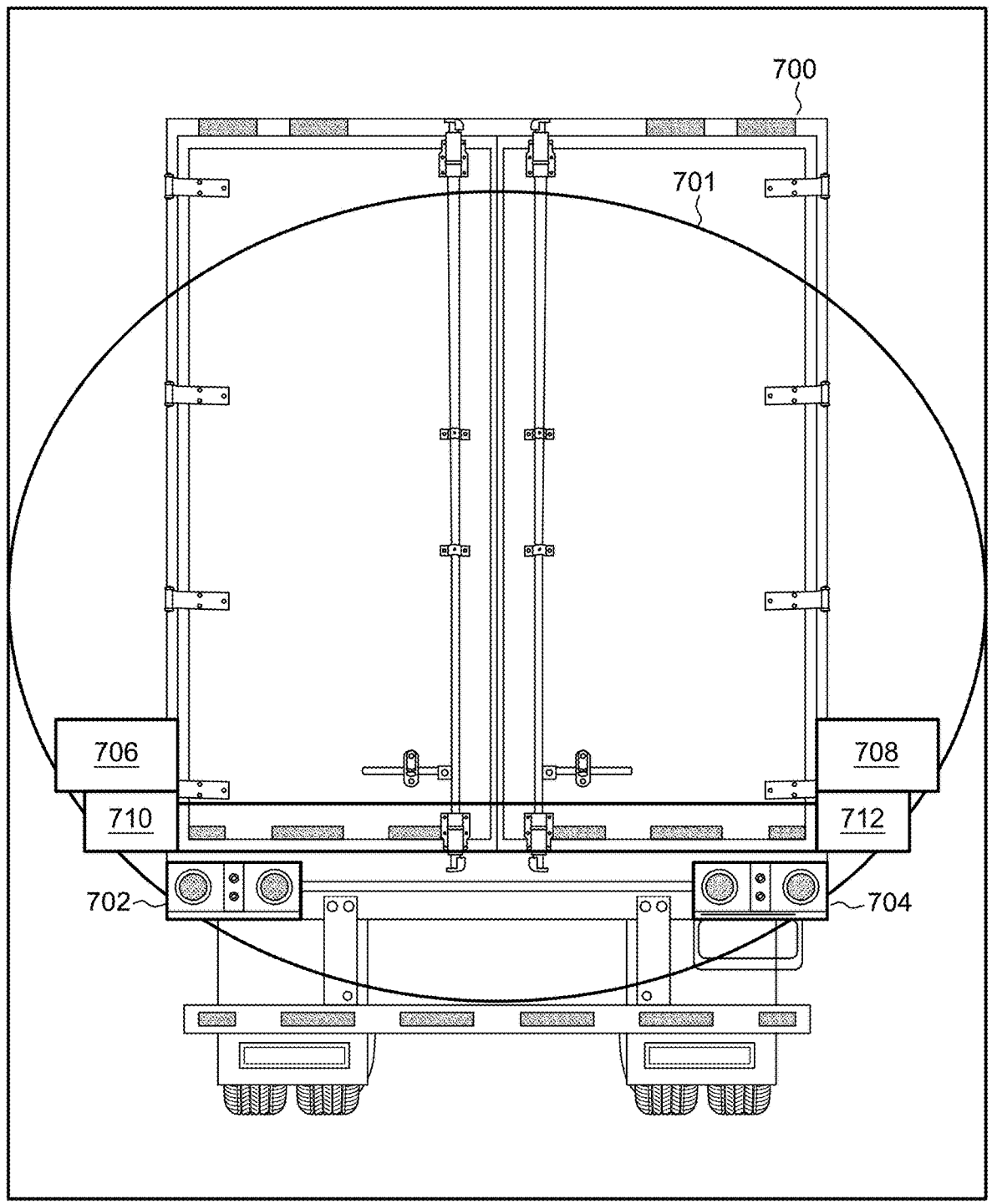

FIGS. 7A through 7E depict a real-world representation of an augmented reality processing environment of FIG. 1, for displaying a received communication on a stationary object, in an embodiment in accordance with the present invention. In another example embodiment, vehicle 102 may not be able to view traffic stop 401 when traveling behind a large-size vehicle. In this case, information of a traffic stop, such as traffic stop 401, can be received through an optical beacon, such as the brake lights of the large-size vehicle. In the example embodiment of FIG. 7A, vehicle 102 is stopped behind large-size vehicle 700 and driver 306 is unable to view traffic stop 401 (e.g., blocked by another vehicle). Vehicle safety state determining unit 308, using traffic light/sign detection 312, detects and continually tracks large-size vehicle 700. Vehicle safety state determining unit 308, using vehicle state detection 316, determines the vehicle traveling state of vehicle 102 as described in step 504. For example, vehicle state detection 316 determines that vehicle 102 is stopped using sensor 304. Vehicle state detection 316 then detects nearby vehicle conditions using nearby vehicle detection 314, as previously described with respect to step 506. For example, vehicle detection 314 determines that there are no nearby vehicles other than large-size vehicle 700 that is also stopped in front of vehicle 102. Vehicle safety state determining unit 308 then detects the environment as described with respect to step 508. However, since large-size vehicle 700 is blocking vehicle 102 from viewing traffic signal 402, traffic signal 404, and road sign 406, content display managing unit 310 can only detect large-size vehicle 700. In the example embodiment of FIG. 7A, content display managing unit 310 determines that the tail lights and the areas on the sides of large-size vehicle 700 are forbidden objects as depicted in FIG. 7B and indicated by reference indicators 702, 704, 706, 708, 710, and 712.

Content display managing unit 310 determines a display area on the front windshield of vehicle 102 by marking an area of an effective visual field having a center at a center of the position of forbidden objects 702, 704, 706, 708, 710, and 712 as indicated by display area 701. Vehicle safety state determining unit 308 then detects weather conditions as previously described with respect to step 510. For example, vehicle safety state determining unit 308, using camera 110, determines the current weather conditions vehicle 102 is traveling in. Vehicle safety state determining unit 308 then calculates a safety degree as previously described with respect to step 512. For example, vehicle safety state determining unit 308 calculates a safety degree based on the determined vehicle traveling state, the detected nearby vehicle conditions, the detected environment, and the detected weather conditions. For example, as vehicle 102 is stopped behind large-size vehicle 700 in FIG. 7A through 7E, vehicle safety state determining unit 308 determines a "high" safety degree due to vehicle 102 not moving and driver 306 pressing on the brake pedal (not shown). Vehicle safety state determining unit 308 determines that the calculated safety degree has changed from a previous degree and notifies content display managing unit 310 of a safety degree change event as previously described with respect to steps 514 and 516. For example, a previous safety degree may have been "middle" since vehicle 102 may have been slowing down at the time.

Figure 7C:
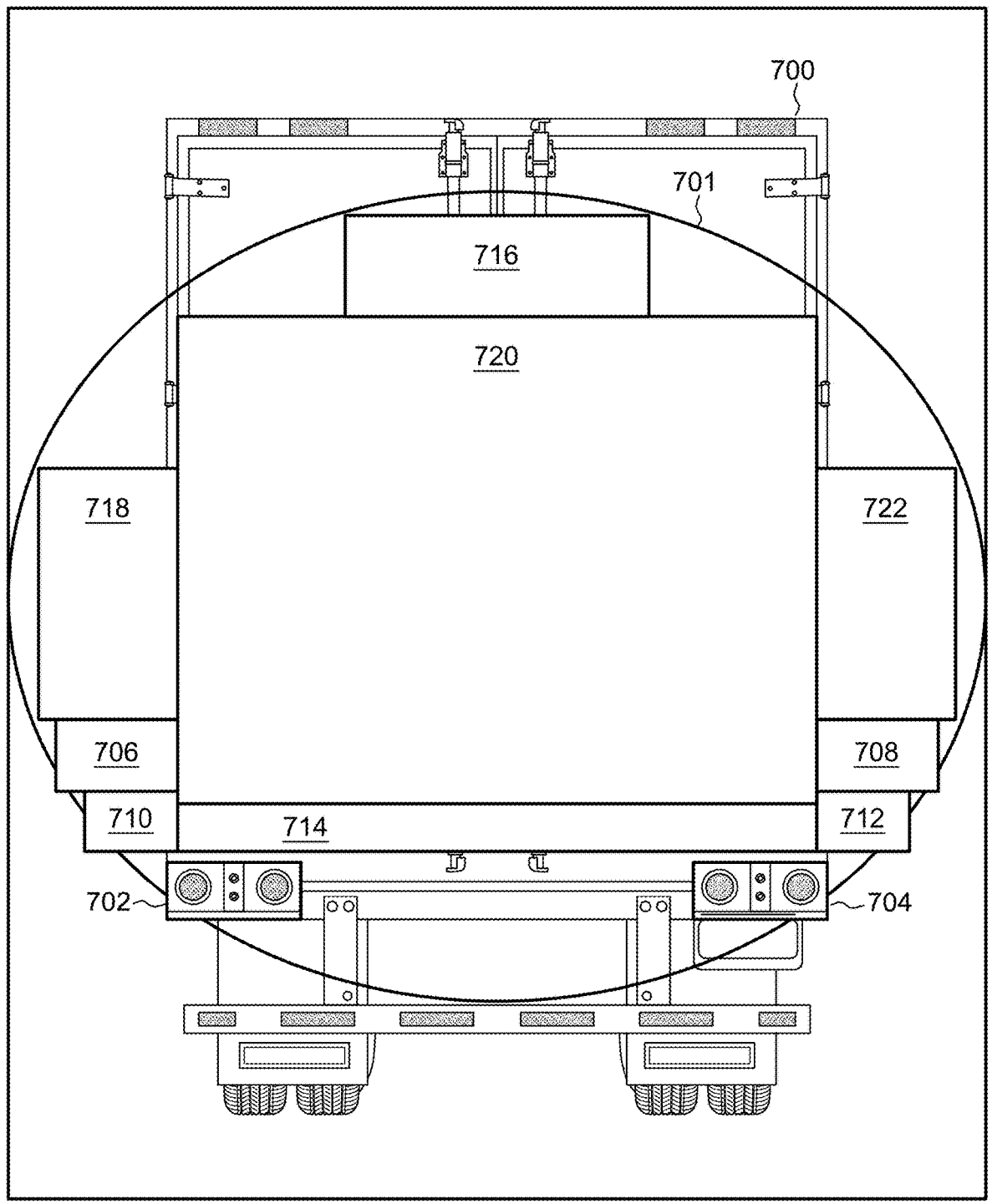
Figure 7D:
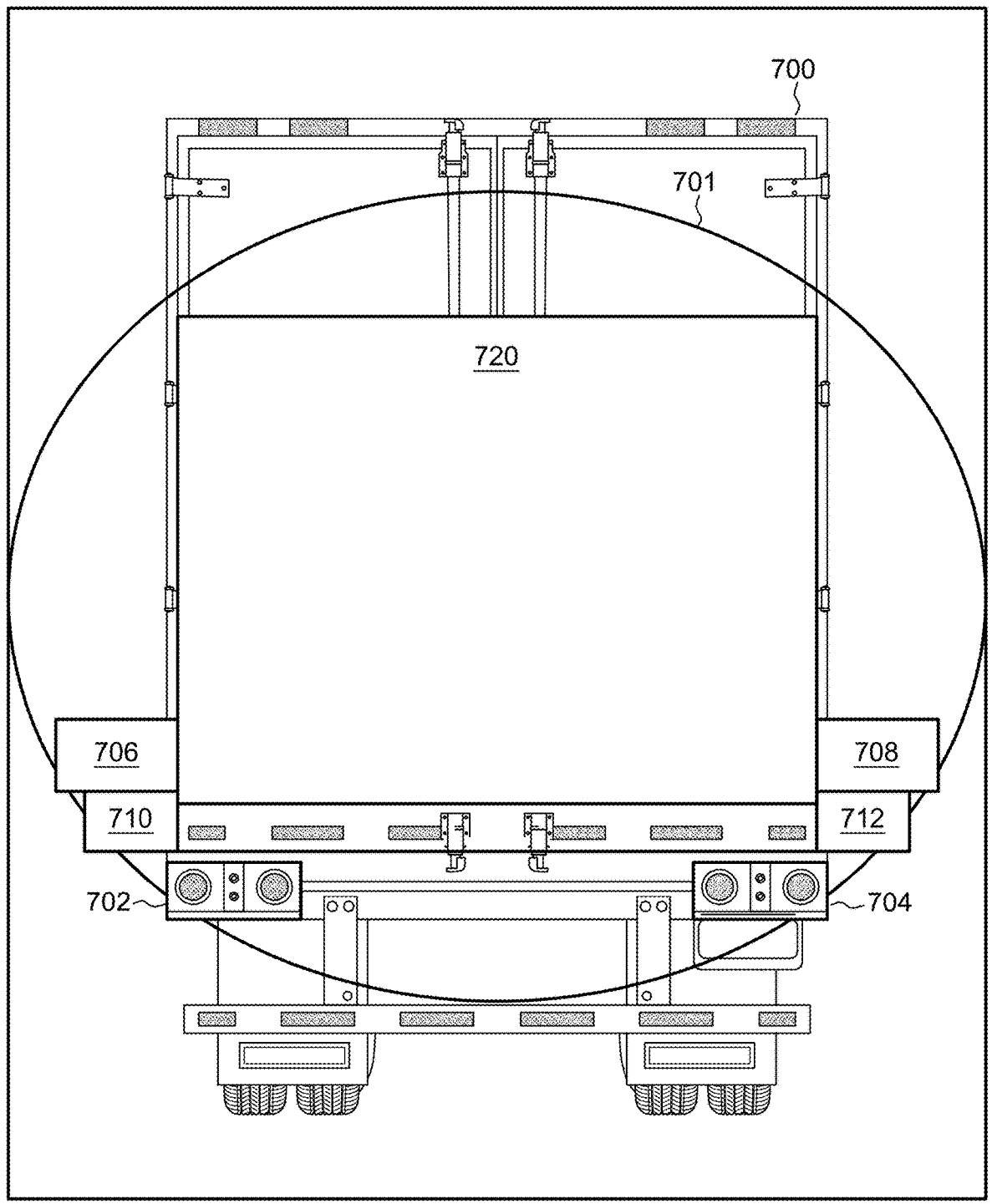
Figure 7E:
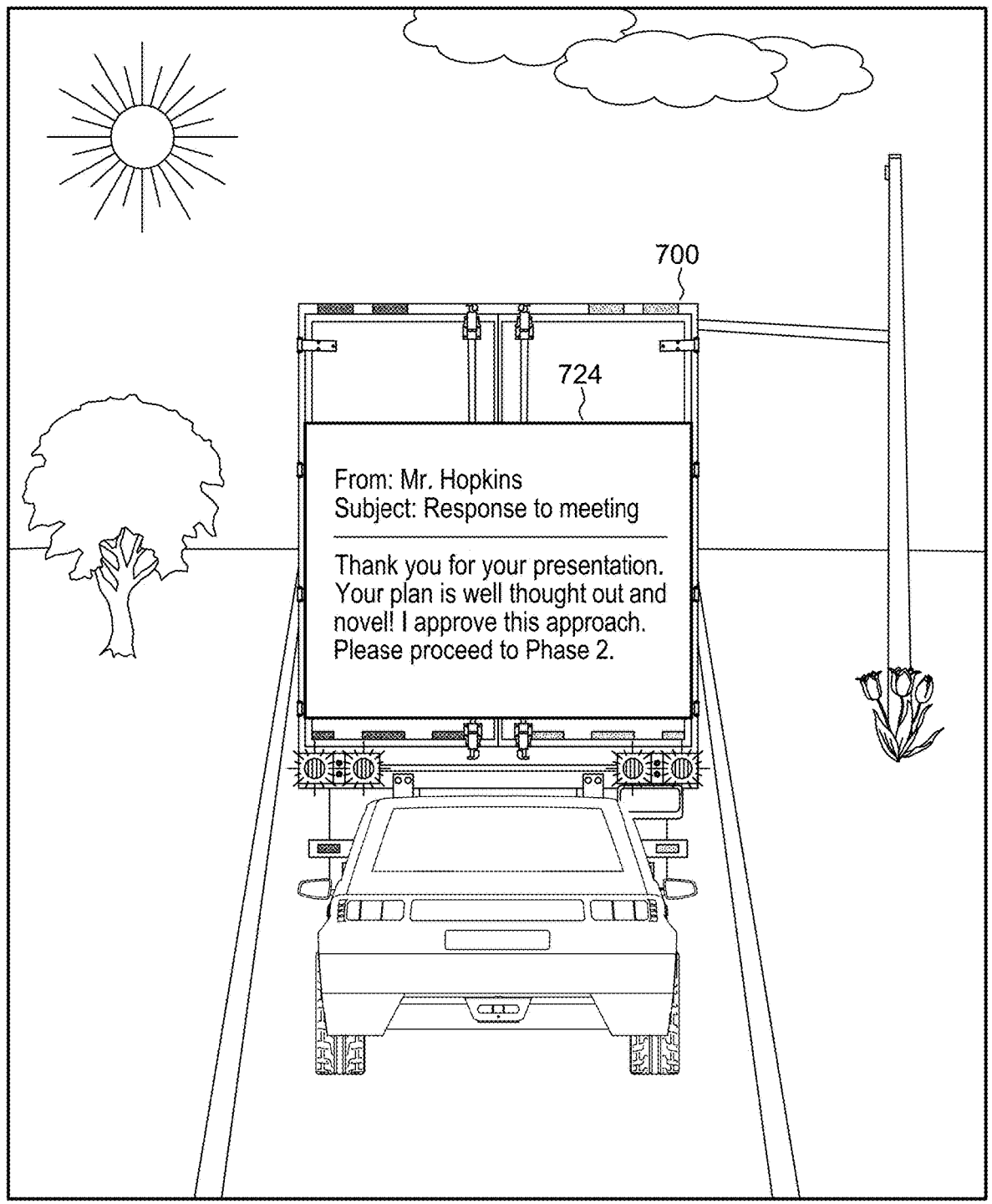

Content display managing unit 310 determines a display area (e.g., display area 701), on the front windshield of vehicle 102 by marking an area of an effective visual field at the boundary of display area 701 so that the tail lights are at the bottom of the display area. Content display managing unit 310 can then exclude (e.g., remove), forbidden objects 702, 704, 706, 708, 710, and 712 by superimposing a rectangular region (not viewable by driver 306), over or around forbidden objects 702, 704, 706, 708, 710, and 712 in the display area as depicted in FIG. 7B. Content display managing unit 310 then calculates a set of rectangular regions within display area 701 that will be used to display received content to driver 306 as previously described with respect to step 604. For example, content display managing unit 310 creates regions 714, 716, 718, 720, and 722, within display area 701 and above forbidden objects 702, 704, 706, 708, 710, and 712 as illustrated in FIG. 7C. Content display managing unit 310 then removes regions 714, 716, 718, and 722 upon determining that regions 714, 716, 718, and 722 do not meet the required dimensions for received attributes for content from a paired mobile phone (not shown) as depicted in FIG. 7D. Content display managing unit 310 notifies an application of the event as previously described with respect to step 606. For example, content display managing unit 310 notifies a text messaging application of a connected smartphone, wherein the notification includes one or more event attributes. For example, the event attributes include information on display area 701, and region 720, and the current safety state of vehicle 102. Content display managing unit 310 can then display the application screen as previously described with respect to step 608. For example, content display managing unit 310 can receive the content from the smartphone application and determine the best display region to display the content in. Upon determining the region that is closest to the height and width dimension of the received content, content display managing unit 310 displays the content in region 720 as illustrated by email 724 in FIG. 7E.

FIG. 8 is a table, generally designated 800, depicting exemplary safety degrees by a content display managing software, on the computer within the augmented reality processing environment of FIG. 1, in an embodiment in accordance with the present invention. It should be appreciated that FIG. 8 provides only an illustration of some safety degrees and does not imply any limitations with regard to the safety degree determinations in different embodiments that may be implemented. Many modifications to the depicted safety degrees and safety condition determinations may be made.

Table 800 depicts various safety degrees (e.g., safety degree 814), of vehicle 102 given signal state 802, vehicle traveling state 804, nearby vehicle detection 806, environment 810, and weather condition 812. In the example embodiment of Table 800, signal state 802 includes a plurality of traffic signal values. For example, an instance of traffic signal 302 can be a "green light", yellow light", or "red light." Vehicle traveling state 804 includes a plurality of vehicle traveling state values. For example, a vehicle 102 traveling state can be "traveling" (e.g., traveling on a highway), "low speed" (e.g., traveling in a parking lot), "decelerating" (e.g., slowing down while approaching a yellow instance of traffic signal 302), "stopping" (e.g., coming to a stop at a red instance of traffic signal 302), or "stopped and/or parking brake (PKB) on" (e.g., vehicle 102 is parked in a driveway with the parking brake engaged). Nearby vehicle detection 806 includes indications (e.g., "Yes" or "No"), on whether other vehicles are nearby. Environment 810 includes values that indicate a number of detected traffic signals, road signs, and/or optical beacons. For example, there can be "few" (e.g., one or two instances of traffic signal 302), or "many" (e.g., a plurality of traffic beacons, construction signs, and/or construction vehicles when traveling through a construction zone). Weather condition 812 includes indications on the current weather conditions (e.g., "good" or "not good"). Safety degree 814 includes a plurality of calculated safety degree values (e.g., "danger," "low," "middle," or "high"). For example, when signal state 802 indicates "Green light," no other states or conditions apply, and the determined safety degree is "Danger" resulting in no content being displayed to a driver of vehicle 102. However, when signal state 802 indicates "Red light, and vehicle traveling state 804 indicates "stopped and/or parking brake (PKB) on," the remaining states or conditions do not apply, and the determined safety degree is "High," which can result in content being displayed to a driver of vehicle 102. In other example embodiments, content display managing unit 310 can additionally include a location based regulatory requirement to the calculation of the safety degree. For example, content display managing unit 310 can detect the location of vehicle 102 in a state that may regulate certain content from being displayed to a driver while operating a vehicle. Upon determining a regulatory requirement of a locality, based on the global positioning system (GPS) coordinates of vehicle 102, content display managing unit 310 can further calculate the safety degree to include the regulatory requirement of the locality. For example, content display managing unit 310 may only emit verbal notifications of received content while vehicle 102 is traveling in the locality.

In other example embodiments, the calculation of the safety degree can include a time value for displaying content to a driver that is operating vehicle 102. For example, vehicle safety state determining unit 308 can calculate a time value that is a prediction of how long it will take vehicle 102 to stop when approaching a red instance of traffic signal 302. For example, using camera 110, and a plurality of sensors 304, vehicle safety state determining unit 308 can determine a distance that vehicle 102 is from traffic signal 302, determine a current traveling speed of vehicle 102, and determine that driver 306 is currently pressing on the brake pedal to calculate a time that it will take for vehicle 102 to come to a complete stop. For example, vehicle safety state determining unit 308 determines that vehicle 102 is decelerating and is currently traveling at 1 miler per hour, traffic signal 302 is fifty feet away, and driver 306 is pressing on the brake pedal, and calculates a time value of 2 seconds in which vehicle 102 will come to a complete stop at traffic signal 302. Content display managing unit 310 can then receive a calculated safety degree that includes the predicted time value and display one or more received content to the driver of vehicle 102. For example, vehicle 102 is coming to a stop at traffic signal 302, content display managing unit 310 can initially display an icon for a received content for the 2 seconds before vehicle 102 comes to a stop, then upon determining vehicle 102 has stopped, display the received content.

Figure 9:
FIG. 9 is a table depicting exemplary content notifications for determined safety degrees, inserted on the computer within the augmented reality processing environment of FIG. 1, in an embodiment in accordance with the present invention.

FIG. 9 is a table, generally designated 900, depicting exemplary content notifications for determined safety degrees, inserted on the computer within the augmented reality processing environment of FIG. 1, in an embodiment in accordance with the present invention. It should be appreciated that FIG. 9 provides only an illustration of some exemplary content notifications for determined safety degrees and does not imply any limitations with regard to the content notifications for determined safety degrees in different embodiments that may be implemented. Many modifications to the content notifications for determined safety degrees may be made.

Table 900 depicts various content notifications displayed in vehicle 102 given safety degree 902, display content 904, email application 906, text messaging application 908, and news application 910. For example, when safety degree 902 indicates "Danger" due to vehicle 102 traveling, display content 904 indicates that no content can be displayed. When safety degree 902 indicates a "low safety", display content 904 can allow icons to be displayed for the various applications. For example, email application 906 can display a notification icon to indicate to driver 306 that a new incoming email has been received. Additionally, text messaging application 908 can display a notification icon to indicate to driver 306 that a new text message has been received.

For example, when safety degree 902 indicates a "High safety degree," due to vehicle 102 being stopped, display content 904 indicates that the entire content is displayed. For example, email application 906 can display the entire body of the new incoming email, text messaging application 908 can display a new text message thread, and news application 910 can display the full content with video.

Figure 10:
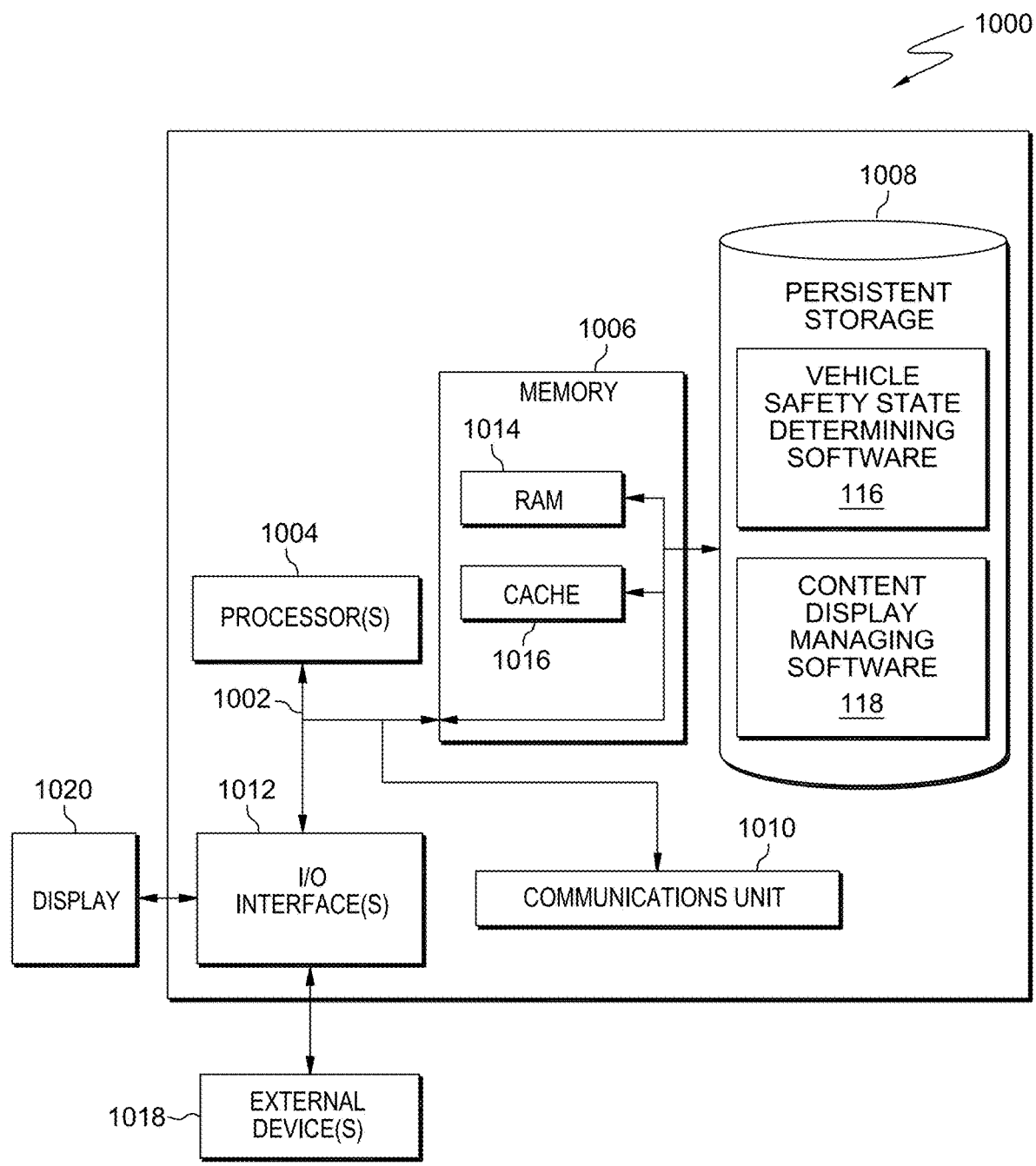
FIG. 10 depicts a block diagram of components of the computer executing the content display managing software, in an embodiment in accordance with the present invention.

FIG. 10 depicts a block diagram, generally designated 1000, of components of the computer executing the content display managing software, in an embodiment in accordance with the present invention. It should be appreciated that FIG. 10 provides only an illustration of one implementation and does not imply any limitations with regard to the environments in which different embodiments may be implemented. Many modifications to the depicted environment may be made.

Vehicle 102 includes communications fabric 1002, which provides communications between computer processor(s) 1004, memory 1006, persistent storage 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and persistent storage 1008 are computer readable storage media. In this embodiment, memory 1006 includes random access memory (RAM) 1014 and cache memory 1016. In general, memory 1006 can include any suitable volatile or non-volatile computer readable storage media.

Vehicle safety state determining software 116 and content display managing software 118 are stored in persistent storage 1008 for execution and/or access by one or more of the respective computer processors 1004 via one or more memories of memory 1006. In this embodiment, persistent storage 1008 includes a magnetic hard disk drive. Alternatively, or in addition to a magnetic hard disk drive, persistent storage 1008 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

Communications unit 1010, in these examples, provides for communications with other data processing systems or devices, including resources of network 120 and server 122. In these examples, communications unit 1010 includes one or more network interface cards. Communications unit 1010 may provide communications through the use of either or both physical and wireless communications links. Vehicle safety state determining software 116 and content display managing software 118 may be downloaded to persistent storage 1008 through communications unit 1010.

I/O interface(s) 1012 allows for input and output of data with other devices that may be connected to vehicle 102. For example, I/O interface 1012 may provide a connection to external devices 1018 such as a keyboard, keypad, a touch screen, and/or some other suitable input device. External devices 1018 can also include portable computer readable storage media such as, for example, thumb drives, portable optical or magnetic disks, and memory cards. Software and data used to practice embodiments of the present invention, e.g., vehicle safety state determining software 116 and content display managing software 118, can be stored on such portable computer readable storage media and can be loaded onto persistent storage 1008 via I/O interface(s) 1012. I/O interface(s) 1012 also connect to a display 1020.

Display 1020 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Definitions

"Present invention" does not create an absolute indication and/or implication that the described subject matter is covered by the initial set of claims, as filed, by any as-amended set of claims drafted during prosecution, and/or by the final set of claims allowed through patent prosecution and included in the issued patent. The term "present invention" is used to assist in indicating a portion or multiple portions of the disclosure that might possibly include an advancement or multiple advancements over the state of the art. This understanding of the term "present invention" and the indications and/or implications thereof are tentative and provisional and are subject to change during the course of patent prosecution as relevant information is developed and as the claims may be amended.

"Embodiment," see the definition for "present invention."

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists at more than one item; there must exist at least two items, but there can also be three, four, or more items.

"Includes" and any variants (e.g., including, include, etc.) means, unless explicitly noted otherwise, "includes, but is not necessarily limited to."

A "user" or a "driver" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "drivers" acting as a single "user" or "driver."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

A "module" is any set of hardware, firmware, and/or software that operatively works to do a function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication. A "sub-module" is a "module" within a "module."

A "computer" is any device with significant data processing and/or machine readable instruction reading capabilities including, but not necessarily limited to: desktop computers; mainframe computers; laptop computers; field-programmable gate array (FPGA) based devices; smart phones;

personal digital assistants (PDAs); body-mounted or inserted computers; embedded device style computers; and/or application-specific integrated circuit (ASIC) based devices.

"Electrically connected" means either indirectly electrically connected such that intervening elements are present or directly electrically connected. An "electrical connection" may include, but need not be limited to, elements such as capacitors, inductors, transformers, vacuum tubes, and the like.

"Mechanically connected" means either indirect mechanical connections made through intermediate components or direct mechanical connections. "Mechanically connected" includes rigid mechanical connections as well as mechanical connection that allows for relative motion between the mechanically connected components. "Mechanically connected" includes, but is not limited to: welded connections; solder connections; connections by fasteners (e.g., nails, bolts, screws, nuts, hook-and-loop fasteners, knots, rivets, quick-release connections, latches, and/or magnetic connections); force fit connections; friction fit connections; connections secured by engagement caused by gravitational forces; pivoting or rotatable connections; and/or slidable mechanical connections.

A "data communication" includes, but is not necessarily limited to, any sort of data communication scheme now known or to be developed in the future. "Data communications" include but are not necessarily limited to: wireless communication; wired communication; and/or communication routes that have wireless and wired portions. A "data communication" is not necessarily limited to: (i) direct data communication; (ii) indirect data communication; and/or (iii) data communication where the format, packetization status, medium, encryption status, and/or protocol remains constant over the entire course of the data communication.

The phrase "without substantial human intervention" means a process that occurs automatically (often by operation of machine logic, such as software) with little or no human input. Some examples that involve "no substantial human intervention" include: (i) a computer is performing complex processing and a human switches the computer to an alternative power supply due to an outage of grid power so that processing continues uninterrupted; (ii) a computer is about to perform resource intensive processing and a human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

"Automatically" means "without any human intervention."

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

What is claimed is:

1. A computer-implemented method comprising:
    detecting, by one or more computer processors, a traffic signal;
    in response to detecting the traffic signal, calculating, by one or more computer processors, a safety degree of a vehicle;
    calculating, by one or more computer processors, based on a position of the traffic signal, a display area for a front glass of the vehicle; and
    determining, by one or more processors, whether to project content onto the display area in accordance with the safety degree;
    wherein calculating the display area comprises:
        determining, by one or more computer processors, an effective visual field having a center at the position of the traffic signal;
        excluding, by one or more computer processors, from the determined effective visual field, superposition forbidden objects;
        upon excluding the superposition forbidden objects, calculating, by one or more computer processors, a set of rectangular regions included in the determined effective visual field; and
        excluding, by one or more computer processors, from the determined effective visual field, a rectangular region of the set of rectangular regions based, at least in part, on a height and a width of the rectangular region.

2. The computer-implemented method of claim 1, wherein the safety degree is calculated based, at least in part, on:
    a traveling state of the vehicle; and
    a status of one or more traveling vehicles in the proximity of the vehicle.

3. The computer-implemented method of claim 2, wherein the safety degree is further calculated based, at least in part, on:
    a traveling environment, wherein the traveling environment includes a number of traffic signals and signs; and
    a weather condition.

4. The computer-implemented method of claim 1, further comprising:
    determining to project the content, wherein an amount of information of the content being projected is increased as the safety degree rises.

5. The computer-implemented method of claim 1, wherein the traffic signal is blocked by another vehicle, and the display area is calculated based on a position of a rear body of the other vehicle.

6. A computer program product comprising:
    one or more computer readable storage devices and program instructions stored on the one or more computer readable storage devices, the stored program instructions comprising:
        program instructions to detect a traffic signal;
        program instructions to, in response to detecting the traffic signal, calculate a safety degree of a vehicle;
        program instructions to calculate, based on a position of the traffic signal, a display area for a front glass of the vehicle; and
        program instructions to determine whether to project content onto the display area, in accordance with the safety degree;

wherein the program instructions to calculate the display area comprise:
program instructions to determine an effective visual field having a center at the position of the traffic signal;
program instructions to exclude, from the determined effective visual field, superposition forbidden objects;
program instructions to, upon excluding the superposition forbidden objects, calculate a set of rectangular regions included in the determined effective visual field; and
program instructions to exclude, from the determined effective visual field, a rectangular region of the set of rectangular regions based, at least in part, on a height and a width of the rectangular region.

7. The computer program product of claim 6, wherein the safety degree is calculated based, at least in part, on:
a traveling state of the vehicle; and
a status of one or more traveling vehicles in the proximity of the vehicle.

8. The computer program product of claim 7, wherein the safety degree is further calculated based, at least in part, on:
a traveling environment, wherein the traveling environment includes a number of traffic signals and signs; and
a weather condition.

9. The computer program product of claim 6, wherein the stored program instructions further comprise:
program instructions to determine to project the content, wherein an amount of information of the content being projected is increased as the safety degree increases.

10. The computer program product of claim 6, wherein the traffic signal is blocked by another vehicle, and the display area is calculated based on a position of a rear body of the other vehicle.

11. A computer system comprising:
one or more computer processors;
one or more computer readable storage media;
program instructions stored on the computer readable storage media for execution by at least one of the one or more processors, the stored program instructions comprising:
program instructions to detect a traffic signal;
program instructions to, in response to detecting the traffic signal, calculate a safety degree of a vehicle;
program instructions to calculate, based on a position of the traffic signal, a display area for a front glass of the vehicle; and
program instructions to determine whether to project content onto the display area, in accordance with the safety degree;
wherein the program instructions to calculate the display area comprise:
program instructions to determine an effective visual field having a center at the position of the traffic signal;
program instructions to exclude, from the determined effective visual field, superposition forbidden objects;
program instructions to, upon excluding the superposition forbidden objects, calculate a set of rectangular regions included in the determined effective visual field; and
program instructions to exclude, from the determined effective visual field, a rectangular region of the set of rectangular regions based, at least in part, on a height and a width of the rectangular region.

12. The computer system of claim 11, wherein the safety degree is calculated based, at least in part, on:
a traveling state of the vehicle; and
a status of one or more traveling vehicles in the proximity of the vehicle.

13. The computer system of claim 12, wherein the safety degree is further calculated based, at least in part, on:
a traveling environment, wherein the traveling environment includes a number of traffic signals and signs; and
a weather condition.

14. The computer system of claim 11, wherein the stored program instructions further comprise:
program instructions to determine to project the content, wherein an amount of information of the content being projected is increased as the safety degree increases.

15. The computer-implemented method of claim 1, further comprising:
in response to determining that the safety degree of the vehicle indicates danger, determining not to project the content.

16. The computer program product of claim 6, wherein the stored program instructions further comprise:
program instructions to, in response to determining that the safety degree of the vehicle indicates danger, determine not to project the content.

17. The computer system of claim 11, wherein the stored program instructions further comprise:
program instructions to, in response to determining that the safety degree of the vehicle indicates danger, determine not to project the content.

18. The computer system of claim 11, wherein the traffic signal is blocked by another vehicle, and the display area is calculated based on a position of a rear body of the other vehicle.

* * * * *